(12) United States Patent
Sanou

(10) Patent No.: US 11,076,056 B2
(45) Date of Patent: Jul. 27, 2021

(54) COMMUNICATION SYSTEM AND ELECTRONIC DEVICE

(71) Applicant: KYOCERA Document Solutions Inc., Osaka (JP)

(72) Inventor: Masaki Sanou, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 70 days.

(21) Appl. No.: 16/498,112

(22) PCT Filed: Mar. 30, 2018

(86) PCT No.: PCT/JP2018/013526
§ 371 (c)(1),
(2) Date: Sep. 26, 2019

(87) PCT Pub. No.: WO2018/181852
PCT Pub. Date: Oct. 4, 2018

(65) Prior Publication Data
US 2021/0105368 A1    Apr. 8, 2021

(30) Foreign Application Priority Data
Mar. 31, 2017   (JP) .............................. JP2017-071033

(51) Int. Cl.
*H04N 1/00* (2006.01)
(52) U.S. Cl.
CPC ..... *H04N 1/00209* (2013.01); *H04N 1/00307* (2013.01); *H04N 1/00411* (2013.01); *H04N 2201/006* (2013.01)

(58) Field of Classification Search
CPC ........... H04N 1/00209; H04N 1/00307; H04N 1/00411; H04N 2201/006; H04N 1/00; G06F 13/00
(Continued)

(56) References Cited

U.S. PATENT DOCUMENTS

2016/0150123 A1* 5/2016 Okada ................... G06Q 10/00
                                                          358/440
2016/0219190 A1   7/2016 Sugiyama et al.
(Continued)

FOREIGN PATENT DOCUMENTS

JP     2004-040206 A    2/2004
JP     2014-093765 A    5/2014
(Continued)

*Primary Examiner* — Miya J Williams
*Assistant Examiner* — Darryl V Dottin
(74) *Attorney, Agent, or Firm* — IP Business Solutions, LLC

(57) ABSTRACT

In a communication system (Sy), mail information is transmitted from a portable terminal device (20) to an image forming apparatus (10) through short distance communication. In the image forming apparatus (10), the mail information is received at a first near field radio communication section (16) and stored into a first storage section (19), a destination address, a title, and a text are displayed on a screen of a first display section (12) based on the mail information, an e-mail is created by use of the destination address, the title, and the text on the screen selected through operation of a first operation section (14), image data is transmitted from a first network communication section (15) with the created e-mail, and then the mail information is erased from the first storage section (19).

7 Claims, 23 Drawing Sheets

(58) Field of Classification Search
USPC .......................................................... 358/1.15
See application file for complete search history.

(56) References Cited

U.S. PATENT DOCUMENTS

2016/0301824 A1* 10/2016 Shibao ............... H04N 1/00212
2018/0352110 A1   12/2018 Shibao

FOREIGN PATENT DOCUMENTS

| JP | 2016-099812 A | 5/2016 |
| JP | 2016-139937 A | 8/2016 |
| JP | 2016-201702 A | 12/2016 |

* cited by examiner

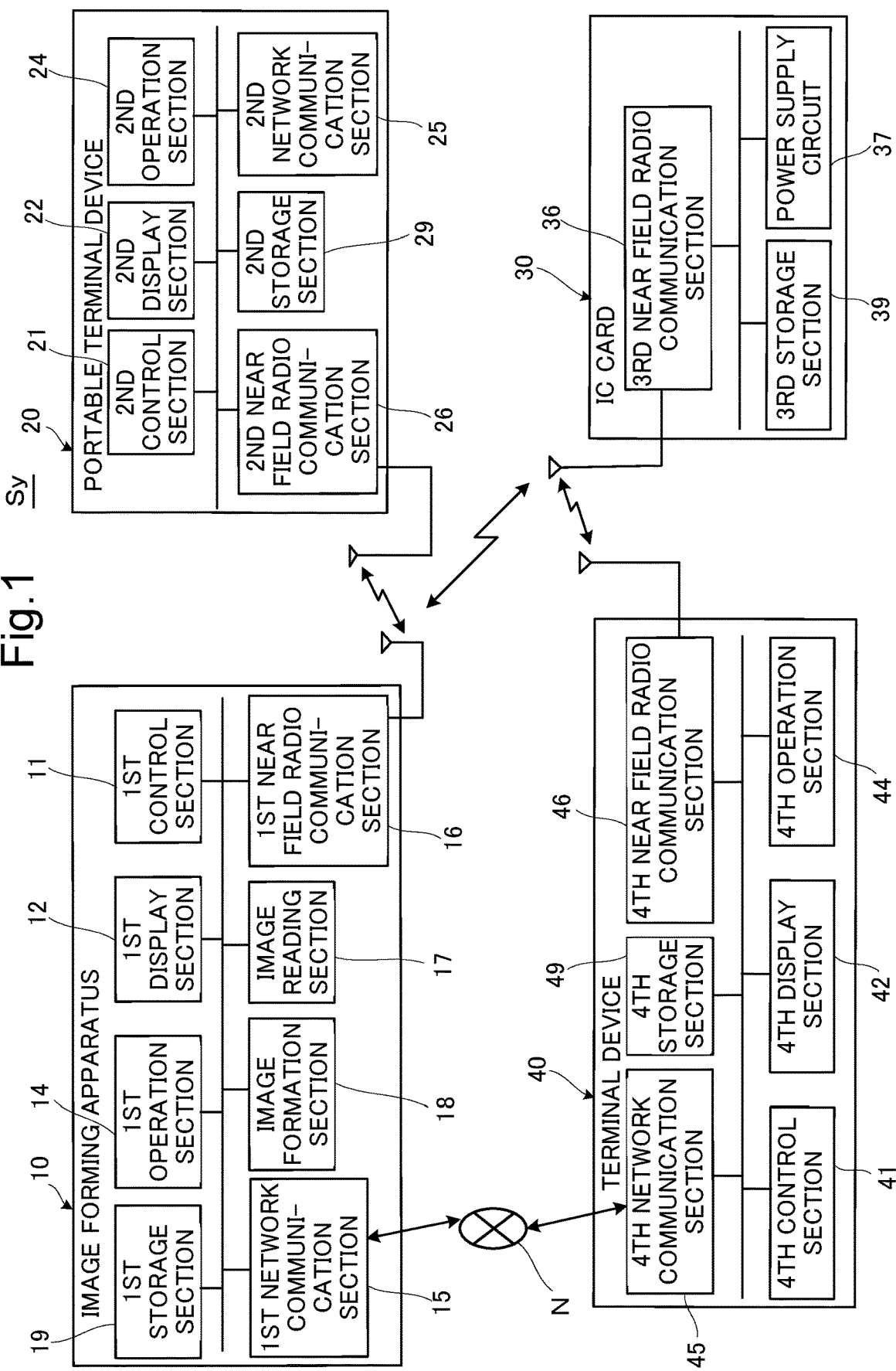

Fig.2

MAIL INFORMATION M

DESTINATION ADDRESS INFORMATION LIST

| DESTINATION ADDRESS INFORMATION |
|---|
| E11 — ...... |
| E12 — ...... |
| E13 — ...... |
| E14 — ...... |

TITLE LIST L2

| TITLE |
|---|
| E21 — ...... |
| E22 — ...... |
| E23 — ...... |
| E24 — ...... |

TEXT LIST L3

| TEXT |
|---|
| E31 — ...... |
| E32 — ...... |
| E33 — ...... |
| E34 — ...... |

FILE NAME LIST L4

| FILE NAME |
|---|
| E41 — ...... |
| E42 — ...... |
| E43 — ...... |
| E44 — ...... |

TRANSMISSION SOURCE ADDRESS INFORMATION LIST L5

| TRANSMISSION SOURCE ADDRESS |
|---|
| E51 — ...... |
| E52 — ...... |
| E53 — ...... |
| E54 — ...... |

TRANSMISSION SOURCE ADDRESS-
TEXT CORRESPONDENCE LIST L6

| TRANSMISSION SOURCE ADDRESS INFORMATION | TEXT |
|---|---|
| ...... | ...... |
| ...... | ...... |
| ...... | ...... |
| ...... | ...... |

COMMUNICATION SYSTEM AND ELECTRONIC DEVICE

TECHNICAL FIELD

The present invention relates to an electronic device and a communication system which performs short distance communication between the electronic device and a portable terminal, and more specifically to a technology for supporting creation of electronic data to be transmitted in the electronic device by use of the portable terminal.

BACKGROUND ART

Some image forming apparatuses which are capable of data communication such as mail transmission through a network have a function of reading a document to generate image data indicating an image of the document or receiving and storing the image data and transmitting the image data by an e-mail. The aforementioned function is frequently used in offices, etc.

Here, a user is required to input a destination address, a title, a text, a file name of the image data, a transmission source address, etc. upon the e-mail transmission. However, an operation section of the image forming apparatus is designed with a priority put on operability for properly using a plurality of functions related to image formation, for example, document reading and image recording on recording paper, and cannot be said to be suitable for the e-mail creation which requires character input for inputting the destination address, etc. Thus, for example, the destination address, the tile, the text, the file name of the image data, the transmission source address, etc. can previously be stored as a plurality of fixed models and an e-mail can be substantially created through simple operation of selecting any of the aforementioned fixed models.

Patent Literature 1 discloses that external destination information is stored into an image forming apparatus and internal destination information is stored into a portable terminal, and then upon transmission of image data generated in the image forming apparatus, the external destination information is transmitted from the image forming apparatus to the portable terminal, the external destination information and the internal destination information are displayed in the portable terminal, either of the external destination information and the internal destination information is selected on a portable terminal side, the image data is transmitted to a destination of the external destination information from the image forming apparatus in a case where the external destination information has been selected, and the image data is transmitted from the image forming apparatus to a destination of the internal destination information via the portable terminal in a case where the internal destination information has been selected.

CITATION LIST

Patent Literature

[Patent Literature 1] Japanese Patent Application Laid-open No. 2014-93765

SUMMARY OF THE INVENTION

However, the aforementioned image forming apparatus is required to previously store, therein as the fixed models, the destination address, the title, the text, the file name of the image data, the transmission source address, etc. In this case, each of the pieces of information as personal information is continuously stored in the image forming apparatus, which is therefore not favorable from the viewpoint of information leakage. Moreover, Patent Literature 1 does not provide any technical disclosure for supporting e-mail creation, and an amount of data communication performed between the image forming apparatus and the portable terminal remarkably increases upon the transmission of the image data from the image forming apparatus to the portable terminal, which results in an increase in, for example, communication time.

In view of the circumstance described above, the present invention has been made, and it is an object of the invention to more easily perform operation on an electronic device for electronic data transmission without storing transmission information such as transmission partner information for long time on an electronic device side where the data transmission is performed.

A communication system according to one aspect of the invention includes: an electronic device transmitting electronic data through a network; and a portable terminal performing wireless short distance communication with the electronic device, in which the portable terminal includes: a storage section storing transmission information of the electronic data, the transmission information including at least transmission partner information; and a second short distance communication section transmitting the transmission information to the electronic device, and the electronic device includes: a display section; an operation section to which an instruction from a user is inputted; a first short distance communication section receiving the transmission information from the portable terminal; a network communication section transmitting the electronic data; and a control section displaying, on a screen of the display section, a list including the transmission partner information indicated by the transmission information received at the first short distance communication section, creating electronic data as a transmission target by use of the transmission partner information selected from the list through operation of the operation section and transmission target data, causing the network communication section to transmit the created electronic data, and erasing, from the electronic device, the transmission information received from the portable terminal after the transmission.

An electronic device according to another aspect of the invention transmits electronic data through a network and performs wireless short distance communication with a portable terminal, and includes: a display section; an operation section to which an instruction from a user is inputted; a first short distance communication section receiving transmission information of the electronic data from the portable terminal, the transmission information including at least transmission partner information; a network communication section transmitting the electronic data; and a control section displaying, on a screen of the display section, a list including the transmission partner information indicated by the transmission information received at the first short distance communication section, creating electronic data as a transmission target by use of the transmission partner information selected from the list through operation of the operation section and transmission target data, causing the network communication section to transmit the created electronic data, and erasing, from the electronic device, the transmission information received from the portable terminal after the transmission.

Effects of the Invention

With the present invention, transmission information such as transmission partner information is not stored for long time on an electronic device side where data transmission is performed, which can more simplify operation performed on an electronic device for electronic data transmission than in a conventional case.

BRIEF DESCRIPTION OF THE DRAWINGS

FIG. 1 is a block diagram illustrating a communication system according to one embodiment of the present invention.

FIG. 2 is a diagram conceptually illustrating mail information stored in a portable terminal or an IC card in the communication system.

DESCRIPTION OF EMBODIMENTS

Figure 3A:
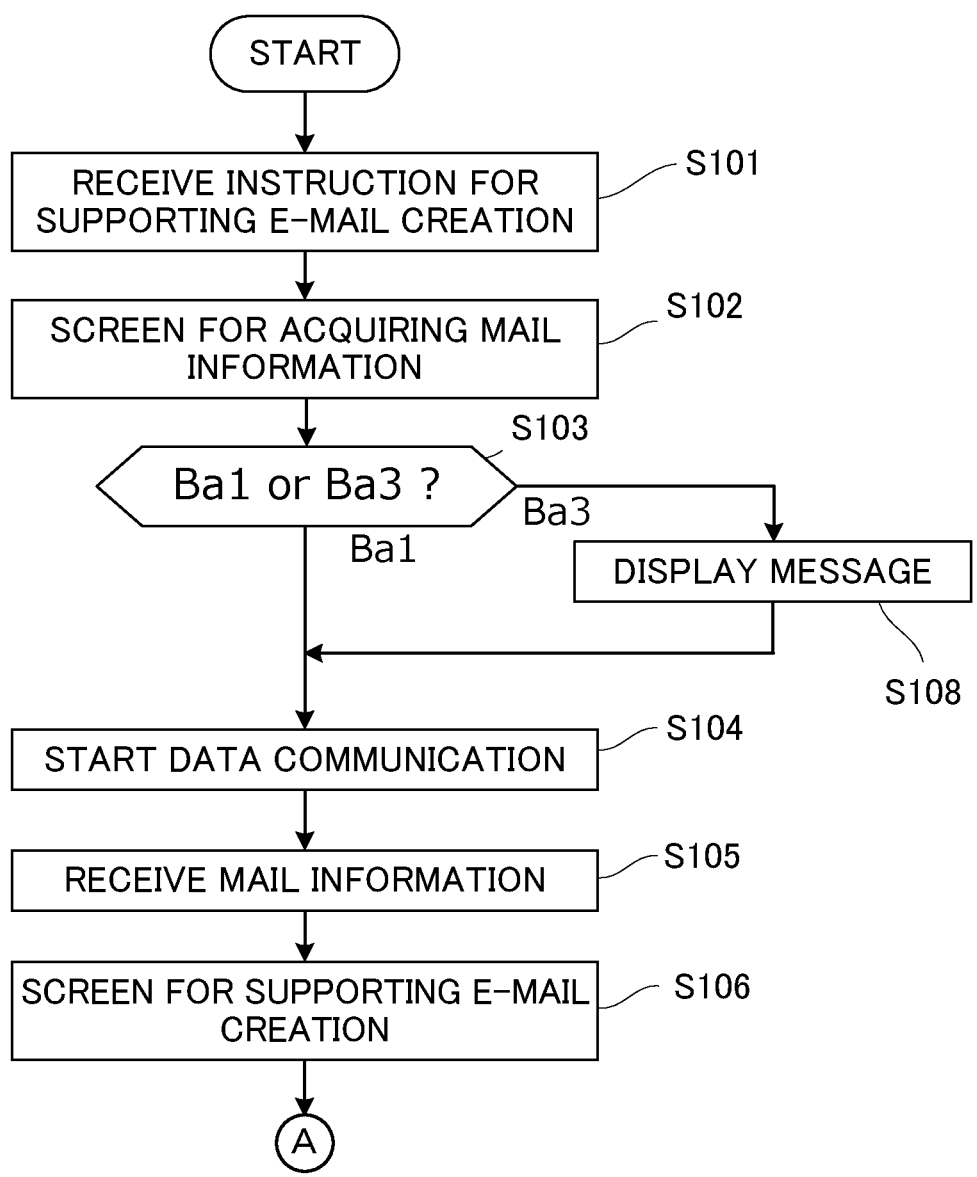
FIG. 3A is a flowchart illustrating processing procedures of an image forming apparatus used for transmission and reception of the mail information from the portable terminal or the IC card to the image forming apparatus upon e-mail creation.

Hereinafter, a communication system and an electronic device according to an embodiment of the present invention will be described with reference to the drawings.

FIG. 1 is a block diagram illustrating a communication system Sy including an image forming apparatus 10, a portable terminal device 20, an IC card 30, and a terminal device 40. In the communication system Sy, the image forming apparatus 10 is a multifunction peripheral combining together a plurality of functions such as a copy function, a printer function, a scanner function, and a facsimile function. The image forming apparatus 10 is one example of an electronic device in the scope of the claims. The portable terminal device 20 is a portable terminal of a multifunctional type a such as a smartphone or a tablet. The IC card 30 is a portable terminal provided as a contactless IC card. The terminal device 40 is, for example, a personal computer. The portable terminal device 20 and the IC card 30 can perform data communication between the image forming apparatus 10 and the terminal device 40 through short distance communication (near field radio communication (NFC) in this embodiment although the short distance communication is not limited to the NFC in any manner). The image forming apparatus 10, the portable terminal device 20, and the terminal device 40 can also perform data communication through the network N. The network N is formed of, for example, a LAN, a public line, or the Internet.

Here, the image forming apparatus 10 includes: a first control section 11, a first display section 12, a first operation section 14, a first network communication section 15, a first near field radio communication section 16, an image reading section 17, an image formation section 18, a first storage section 19, etc.

The first control section 11 is in charge of overall operation control of the image forming apparatus 10 and executes various application programs and also comprehensively controls the image forming apparatus 10. The first operation section 14 is composed of, for example, a plurality of hard keys and a touch panel superposed on a screen of the first display section 12. The first operation section 14 is operated by a user to receive instructions for executing, for example, image formation operation and image reading operation or various pieces of information and then output the instructions and the information to the first control section 11.

The first display section 12 displays screens provided following the execution of the application programs, more specifically, an input screen for set items required for image formation processing or an input screen for instructions and information.

The first network communication section 15 is connected to the terminal device 40 and another terminal via the network N and performs transmission and reception of various pieces of data to and from the terminal device 40 and another terminal.

The first near field radio communication section 16 has an NFC (Near Field Communication) function in this embodiment and transmits and receives various pieces of data to and from the portable terminal device 20 and the IC card 30 through near field radio communication. The first storage section 19 stores the various pieces of application programs, the various pieces of information, etc.

The image reading section 17 has a scanner which optically reads a document loaded on contact glass and generates, through the document reading, image data indicating an image of the document.

The image formation section 18 includes: a photosensitive drum; a charging device which uniformly charges a surface of the photosensitive drum; an exposure device which exposes the surface of the photosensitive drum to form an electrostatic latent image on the surface of the photosensitive drum; a developing device which develops the electrostatic latent image on the surface of the photosensitive drum into a toner image; a transfer device which transfers, onto recording paper serving as a storage medium, the toner image (image) formed on the photosensitive drum; etc. The image formation section 18 forms, on the recording paper, a print page indicated by print data received from, for example, the aforementioned computer or the image indicated by the image data generated by the image reading section 17.

On the other hand, the portable terminal device 20 includes: a second control section 21, a second display section 22, a second operation section 24, a second network communication section 25, a second near field radio communication section 26, a second storage section 29, etc. Note that the portable terminal device 20 and the IC card 30 to be described later on are each one example of a portable terminal in the scope of the claims.

The second control section 21 is in charge of overall operation control of the portable terminal device 20 and executes various application programs, etc. and performs various types of processing. The second operation section 24 is composed of: a plurality of hard keys, a touch panel superposed on a screen of the second display section 22; etc. The second operation section 24 is operated by the user to receive input instructions required for executing the application programs, various pieces of information, etc. and then output the instructions and the information to the second control section 21.

The second display section 22 displays, for example, screens provided following the execution of the application programs.

The second network communication section 25 is connected to the terminal via the network N and transmits and receives various pieces of data to and from the terminal.

The second near field radio communication section 26 has a function as an NFC tag and transmits and receives the various pieces of data to and from the image forming apparatus 10 and the terminal device 40 through the near field radio communication. The second storage section 29 stores the various application programs, the various pieces of information, etc.

The IC card 30 (portable terminal) includes: a third near field radio communication section 36, a power supply circuit 37, a third storage section 39, etc., and thereby functions as an NFC tag.

The third near field radio communication section 36 transmits and receives various types of data to and from the image forming apparatus 10 and the terminal device 40 through near field radio communication. The power supply circuit 37 supplies, to various parts of the IC card 30, a power supplied from an image forming apparatus 10 side via an antenna. The third storage section 39 is a storage medium such as a memory which stores, for example, mail information M to be described later on.

The terminal device 40 includes: a fourth control section 41, a fourth display section 42, a fourth operation section 44, a fourth network communication section 45, a fourth near field radio communication section 46, a fourth storage section 49, etc.

The fourth control section 41 is in charge of overall operation control of the terminal device 40 and executes, for example, various application programs and performs various types of processing. The fourth operation section 44 is composed of, for example, a keyboard and a mouse or a touch panel superposed on a screen of the fourth display section 42. The fourth operation section 44 is operated by the user to receive input instructions required for executing the application programs, various pieces of information, etc. and then output the instructions and the information to the fourth control section 41.

The fourth display section 42 displays, for example, screens provided following the execution of the application programs.

The fourth network communication section 45 is connected to the image forming apparatus 10 and another terminal via the network N and transmits and receives various pieces of data to and from the image forming apparatus 10 and another terminal. The fourth near field radio communication section 46 transmits and receives the various pieces of data to and from the portable terminal device 20 and the IC card 30 through near field radio communication. The fourth storage section 49 stores the various application programs, the various pieces of information, etc.

In the image forming apparatus 10, after the document is read by the image reading section 17 and the image data indicating the image of the document is stored into the first storage section 19 or image data is received from another device by the first network communication section 15 and stored into the first storage section 19, the first control section 11 attaches the image data to an e-mail, and causes the first network communication section 15 to transmit the e-mail to the network N. The aforementioned e-mail is received at a server (not illustrated) on the network N and transmitted from the server to a terminal such as a PC serving as a transmission partner.

Here, upon crating the aforementioned e-mail, the user is required to set a destination address, a title, a text, a transmission source address, etc., but the aforementioned setting cannot efficiently be performed only through operation of the first operation section 14 of the image forming apparatus 10. The first operation section 14 of the image forming apparatus 10 has no keyboard, which therefore causes inconvenience in character inputting. In addition, even if a soft keyboard is displayed on a display screen of the first display section 12, it takes long time for the inputting, so that the image forming apparatus 10 is occupied for the aforementioned inputting for long time.

Thus, in this embodiment, the mail information including the destination address, the transmission source address, the title, the text, etc. required for e-mail creation is previously stored in the second storage section 29 of the portable terminal device 20 or the third storage section 39 of the IC card 30, so that the image forming apparatus 10 acquires the mail information from the portable terminal device 20 or the IC card 30 through the NFC upon the e-mail creation. The e-mail creation is supported in the image forming apparatus 10 in a manner such that the acquired mail information is stored into the first storage section 19 and the destination address, the title, the text, the transmission source address, etc. can be set in the e-mail through simple operation based on the aforementioned mail information.

After the e-mail transmission, the image forming apparatus 10 erases the mail information stored in the first storage section 19 to prevent leak of the mail information. Note that the e-mail is one example of electronic data in the scope of the claims. The mail information is one example of transmission information in the scope of the claims. The destination address is one example of transmission partner information in the scope of the claims. Moreover, the destination address, the title, the text, the transmission address, etc. are each one example as a component of the transmission information in the scope of the claims.

Next, procedures for supporting the e-mail creation in a manner described above will be described in detail.

First, the mail information previously stored in the second storage section 29 of the portable terminal device 20 or the third storage section 39 of the IC card 30 will be described. FIG. 2 is a diagram conceptually illustrating the mail information. As illustrated in FIG. 2, the mail information M includes: a destination address list Title button Bd2, a title list L2, a text list L3, a file name list L4, a transmission source address list L5, and a transmission source address-text correspondence list L6. The destination address list Title button Bd2 is a list of one or a plurality of destination addresses. The destination address list Title button Bd2 also includes destination names stored in correspondence with the respective destination addresses.

The title list L2 includes one or a plurality of titles. The text list L3 includes one or a plurality of texts. The file name list L4 includes one or a plurality of file names. The transmission source address list L5 includes one or a plurality of transmission source addresses. The transmission source address list L5 includes transmission source names stored in correspondence with the transmission source addresses. The transmission source address-text correspondence list L6 includes correspondence between one or the plurality of transmission source addresses and the texts used therefor.

The mail information M as described above is created by, for example, the portable terminal device 20 and stored into the second storage section 29. In the portable terminal device 20, the mail information M is inputted through operation of the second operation section 24 by the user and stored into the second storage section 29 or the destination address, the title, the text, etc. already registered in the second storage section 29 are taken in as the mail information M and stored into the second storage section 29. The second control section 21 transcribes the mail information M in a storage region of, for example, a memory built in the second near field radio communication section 26 for a given period.

After the mail information M is created in the terminal device 40 and stored into the fourth storage section 49, the mail information M is written into the third storage section 39 of the IC card 30 by the terminal device 40. In the terminal device 40, the mail information M is created by the same procedures as procedures employed in the portable terminal device 20 and stored into the fourth storage section 49, and the mail information M is transmitted from the fourth near field radio communication section 46 to the IC card 30 in a state in which the IC card 30 is arranged near the antenna of the fourth near field radio communication section 46 of the terminal device 40. In the IC card 30, the mail information M is received at the third near field radio communication section 36 and stored into the third storage section 39.

Figure 3B:
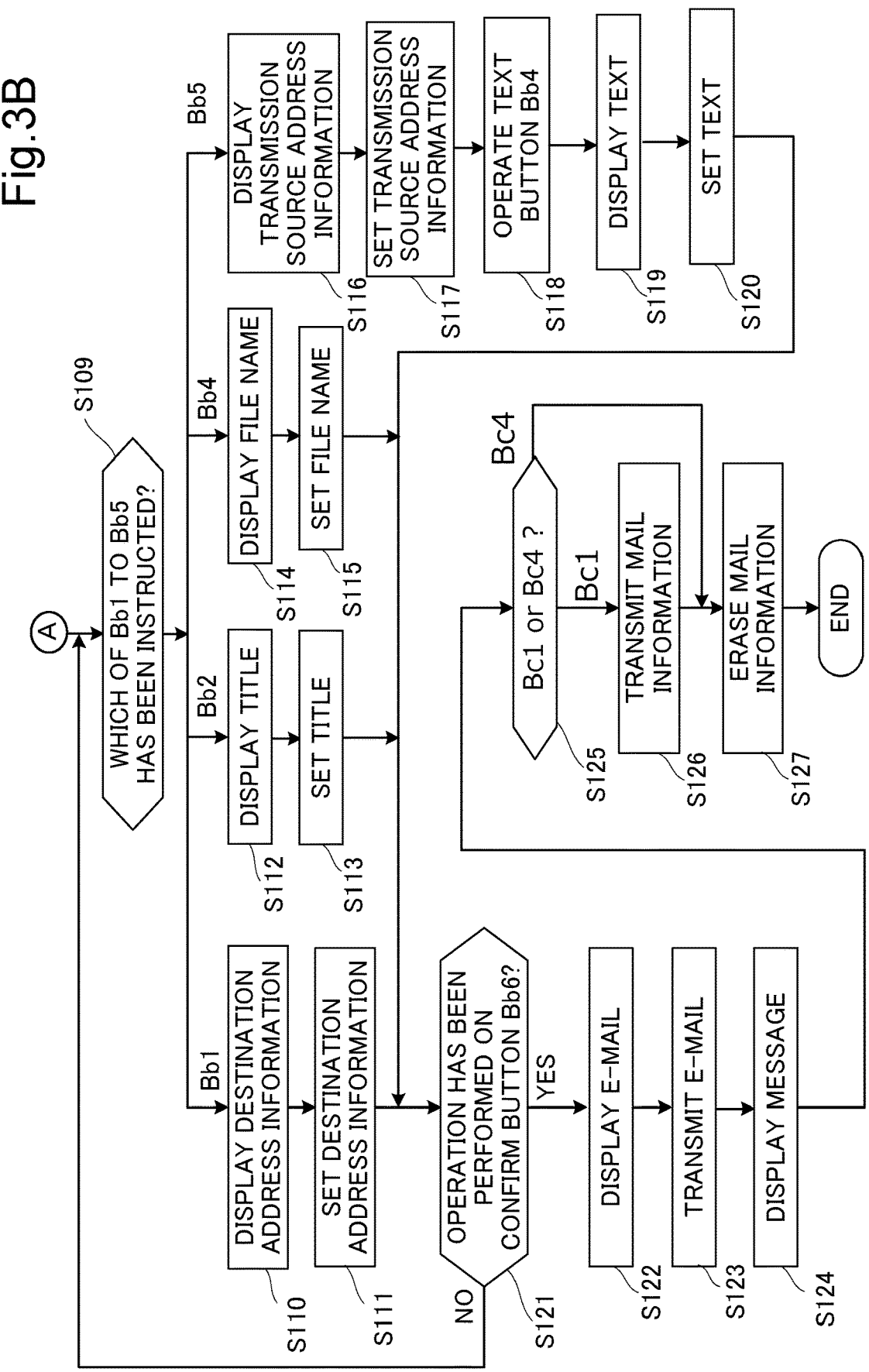
FIG. 3B is a flowchart illustrating processing procedures following FIG. 3A.
Figure 4:
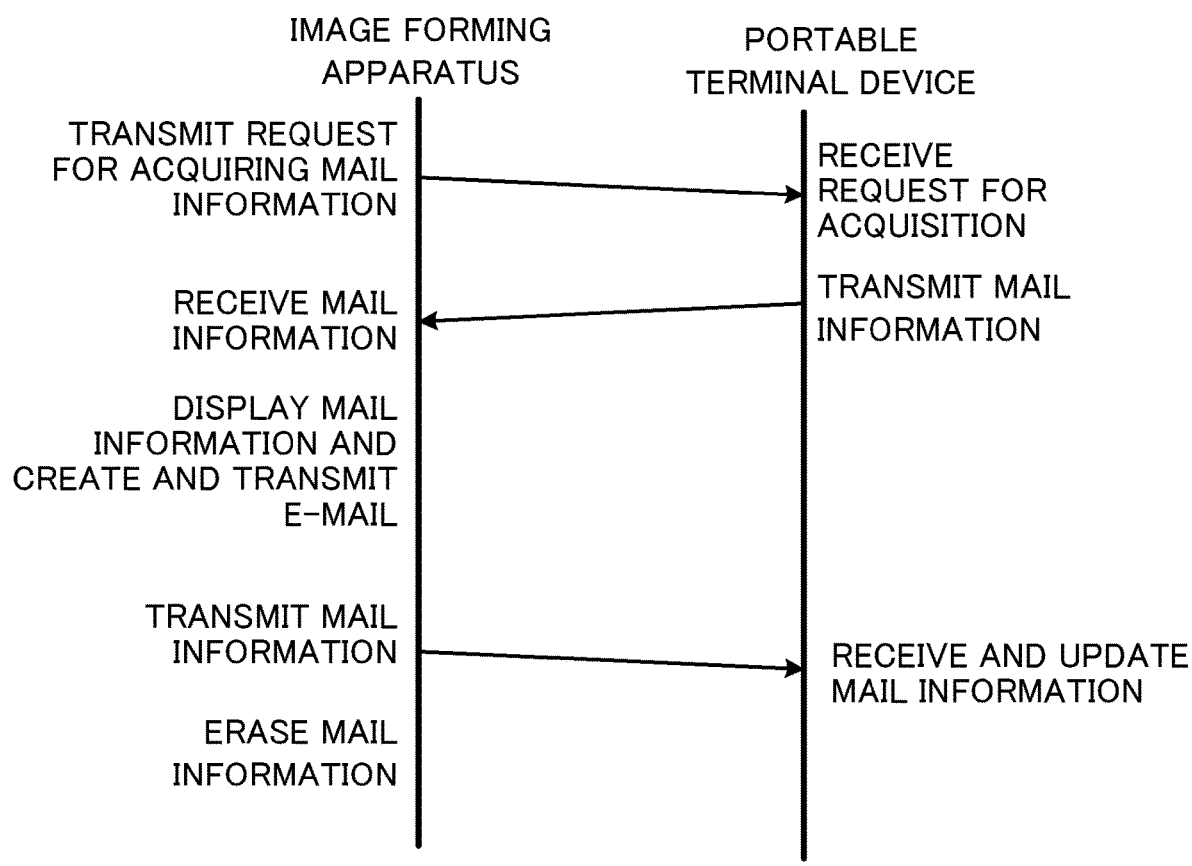
FIG. 4 is a diagram conceptually illustrating procedures of communication performed between the image forming apparatus and the portable terminal or the IC card.

Next, procedures of processing performed in the image forming apparatus 10 for acquiring the mail information M from the portable terminal device 20 or the IC card 30 and using the mail information M for e-mail creation will be described. FIGS. 3A and 3B are flowcharts illustrating the processing procedures. FIG. 4 is a diagram schematically illustrating procedures of communication performed between the image forming apparatus 10 and the portable terminal device 20 or the IC card 30.

In the image forming apparatus 10, after the image data indicating the image of the document is stored into the first storage section 19 by the image reading section 17 or the image data is received from another device by the first network communication section 15 and stored into the first storage section 19, the image data is transmitted by an e-mail. At this point, when the user has operated the first operation section 14 of the image forming apparatus 10 to provide an instruction for executing e-mail creation support processing, the instruction is received by the first control section 11 (step S101).

Figure 5:
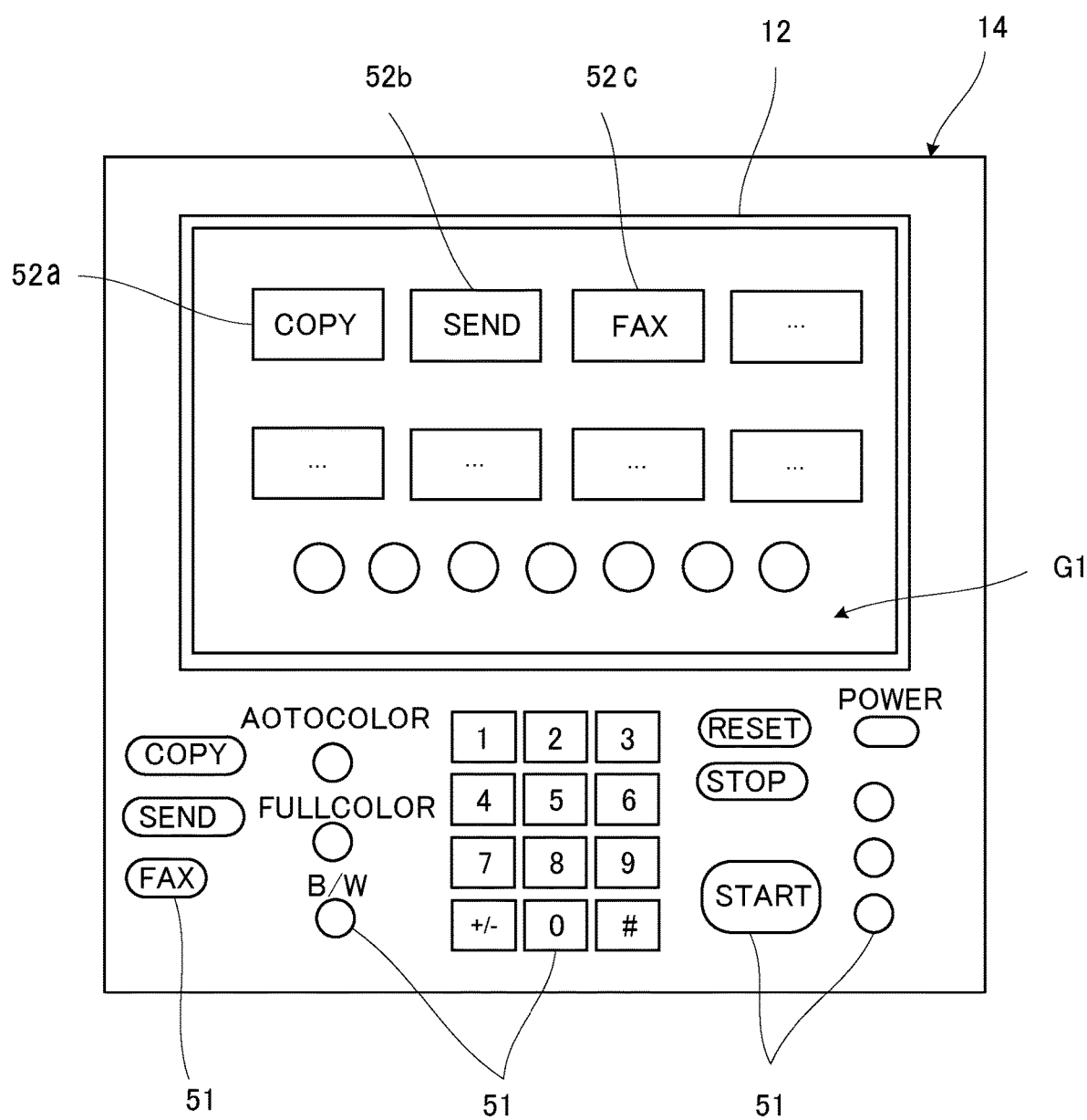
FIG. 5 is a plan view illustrating a first operation section and a first display section of the image forming apparatus.

Here, as illustrated in FIG. 5, the first operation section 14 is integrally provided with the first display section 12. The first operation section 14 includes: the touch panel superposed on the screen of the first display section 12; a plurality of hard keys 51; etc. Upon ending of the document reading by the image reading section 17, an initial screen G1 is displayed at the first display section 12 under control performed by the first control section 11. Displayed on the initial screen G1 are: for example, a plurality of touch keys 52a to 52c corresponding to respective functions. When touch operation has been performed in the aforementioned state by the user, on a transmit key 52b for receiving an instruction for executing the e-mail creation support processing, the touch operation performed on the transmit key 52b is detected by the touch panel of the first operation section 14 and the instruction for executing the e-mail creation support is provided from the first operation section 14 to the first control section 11.

Figure 6:
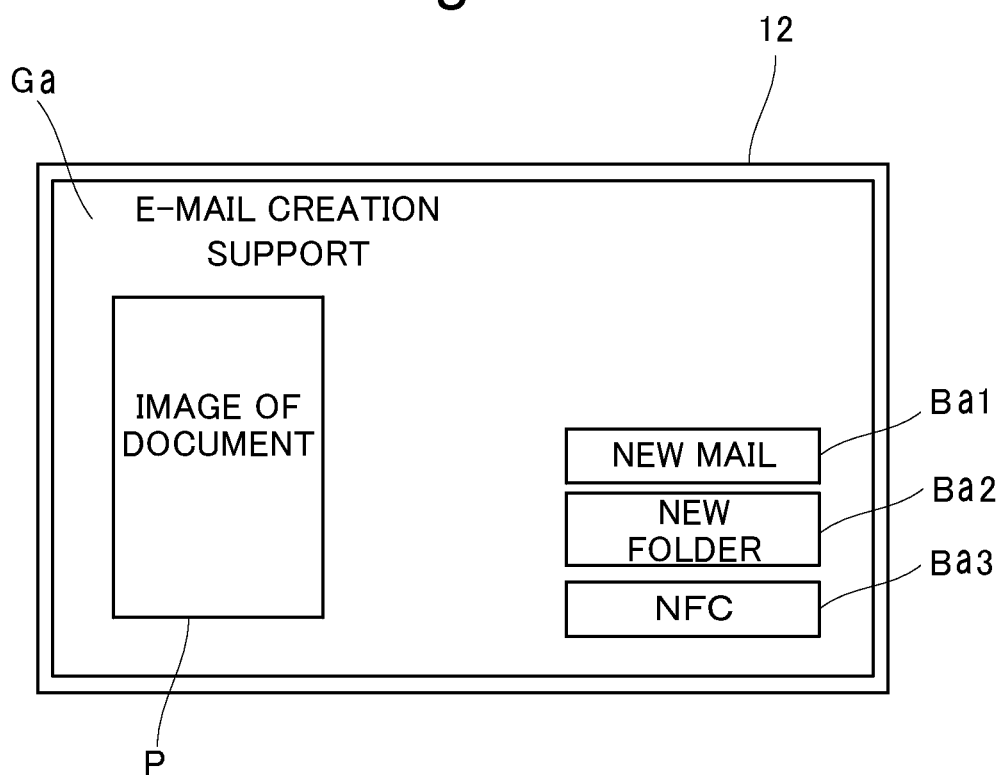
FIG. 6 is a diagram illustrating a screen for acquiring the mail information displayed at the first display section of the image forming apparatus.
Figure 7:
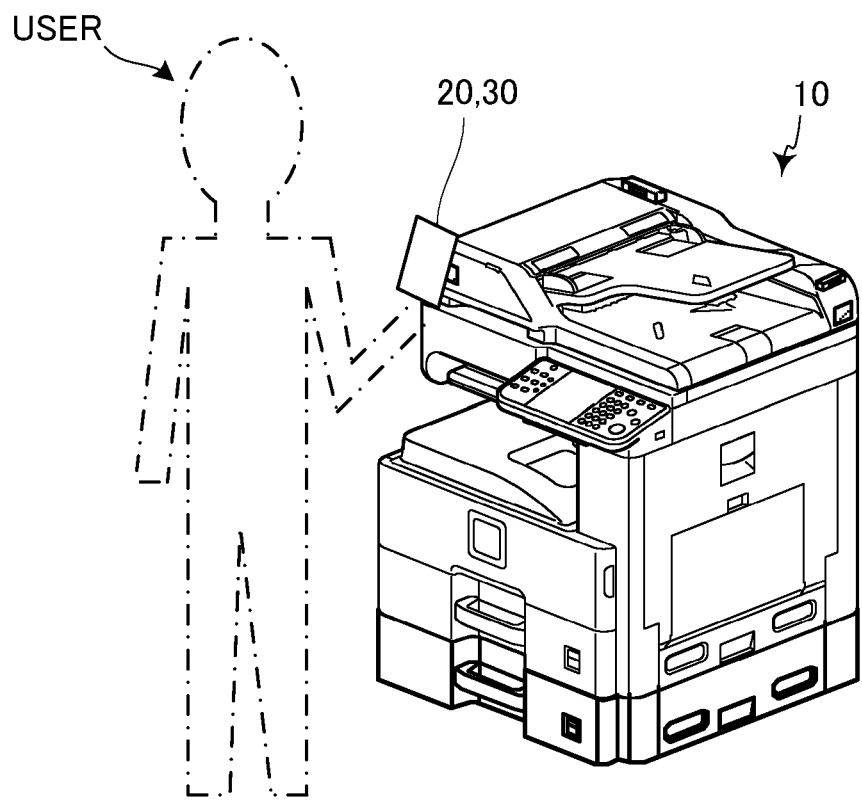
FIG. 7 is a perspective view illustrating a state in which the portable terminal is hung near an antenna of a first near field radio communication section of the image forming apparatus.

When the instruction for executing the e-mail creation support has been provided, the first control section 11 causes the first display section 12 to display a screen Ga as illustrated in FIG. 6 (step S102). Displayed on the screen Ga of the first display section 12 are: a region P where an image indicating contents of the document attached to the e-mail is displayed; a new mail button Ba1; a new folder button Ba2; an NFC button Ba3; etc.

In the aforementioned state, the user hangs the portable terminal device 20 near the antenna of the first near field radio communication section 16 (near the first display section 12 in this embodiment) of the image forming apparatus 10 and also performs touch operation on the new mail button Ba1 of the screen Ga displayed at the first display section 12 on an image forming apparatus 10 side. Upon determination by the first control section 11 that touch operation has been performed on the new mail button Ba1 through the first operation section 14 ("Ba1" in step S103), the first near field radio communication section 16 of the image forming apparatus 10 executes a specified communication protocol with the second near field radio communication section 26 of the portable terminal device 20 to start data communication with the portable terminal device 20 (step S104). The first control section 11 of the image forming apparatus 10 receives, through the data communication, the mail information M transmitted from the second near field radio communication section 26 of the portable terminal device 20 (step S105).

Specifically, when the portable terminal device 20 has approached the first display section 12 of the image forming apparatus 10 in the state provided after step S103, an instruction for acquiring the mail information M from the second near field radio communication section 26 of the portable terminal device 20 is sent from the second near field radio communication section 26 of the portable terminal device 20 to the first near field radio communication section 16 of the image forming apparatus 10. In response to the instruction, the first near field radio communication section 16 of the image forming apparatus 10 transmits, to the second near field radio communication section 26 of the portable terminal device 20, a request for transmitting the mail information M, and the first near field radio communication section 16 receives the mail information M transmitted in response to the aforementioned request from the second near field radio communication section 26 of the portable terminal device 20.

Alternatively, the user holds his or her IC card 30 instead of the portable terminal device 20 near the first display section 12 of the image forming apparatus 10. In this case, the user also performs touch operation on the new mail button Ba1. When the first control section 11 has determined that the touch operation has been performed on the new mail button Ba1 through the first operation section 14 ("Ba1" in step S103), the first near field radio communication section 16 receives the mail information M from the third near field radio communication section 36 of the IC card 30 in a same manner as the manner employed in the portable terminal device 20 described above (step S105).

Figure 8:
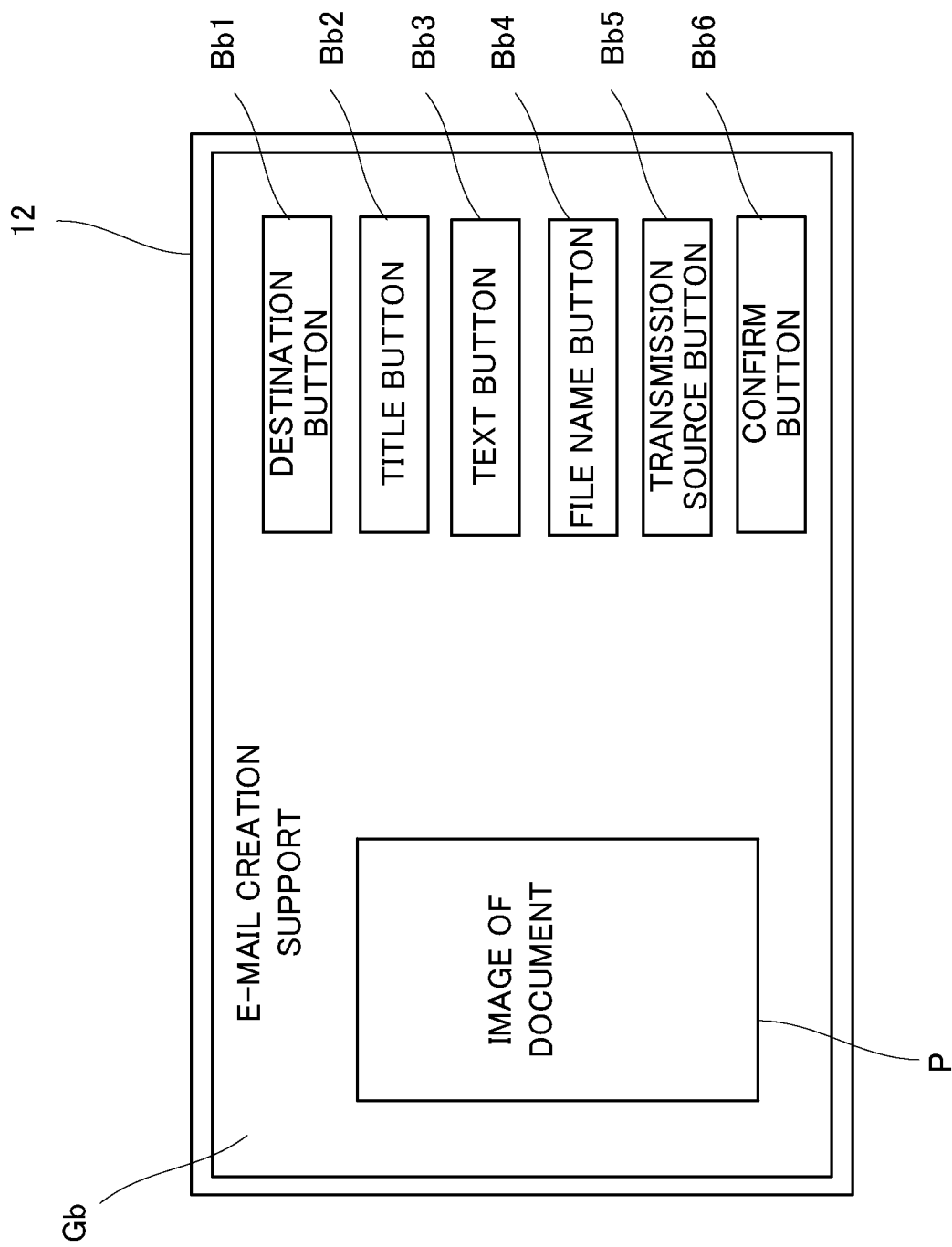
FIG. 8 is a diagram illustrating a screen of the first display section for supporting the e-mail creation.

After the reception of the mail information M in step S105, the first control section 11 of the image forming apparatus 10 stores the mail information M into the first storage section 19 and displays, at the first display section 12, an e-mail creation support screen Gb as illustrated in FIG. 8 (step S106).

Figure 9:
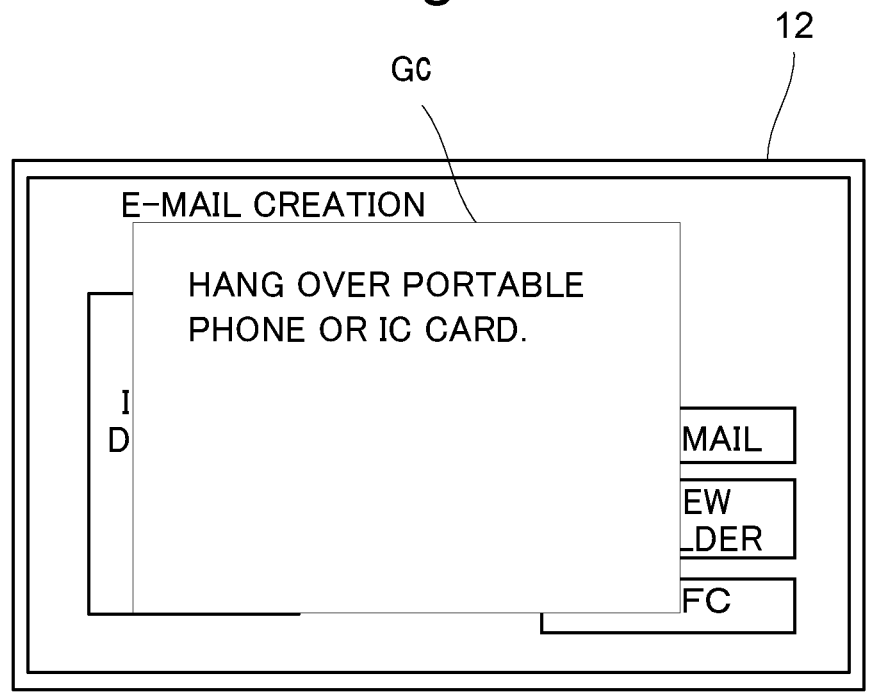
FIG. 9 is a diagram illustrating a screen of the first display section displaying a message which prompts reception of the mail information.

When touch operation has been performed on the NFC button Ba3 by the user ("Ba3" in step S103), a message as illustrated in FIG. 9 and prompting the reception of the mail information M stored in the portable terminal is displayed on a dialog Gc of the first display section 12 under control performed by the first control section 11 (step S108). The user reads the message and holds his or her portable terminal device 20 (or the IC card 30) near the first display section 12 of the image forming apparatus 10. Consequently, it is possible to perform data communication between the image forming apparatus 10 and the portable terminal device 20 (or the IC card 30) based on a specified communication protocol (step S104). Then the processing in S104 to S106 is performed in a same manner as described above.

When the driving power source 10 has acquired the mail information M from the portable terminal device 20 or the IC card 30 of the user as described above, displayed on the e-mail creation support screen Gb (FIG. 8) by the first control section 11 are: an image P indicating contents of data as an e-mail transmission target; a destination button Bb1 for receiving an instruction for displaying the destination address list Title button Bd2 in the mail information M illustrated in FIG. 2; a title button Bb2 for receiving an instruction for displaying the title list L2; a text button Bb3 for receiving an instruction for displaying the text list L3; a file name button Bb4 for receiving an instruction for displaying the file name list L4; a transmission source button Bb5 for receiving an instruction for displaying the transmission source address list L5; a confirm button Bb6: and so on.

Then when the user has performed touch operation with the aforementioned buttons Bb1 to Bb6 appropriately selected and has inputted the respective corresponding instructions to the first operation section 14, processing for the e-mail creation sequentially proceeds in the image forming apparatus 10.

Figure 10:
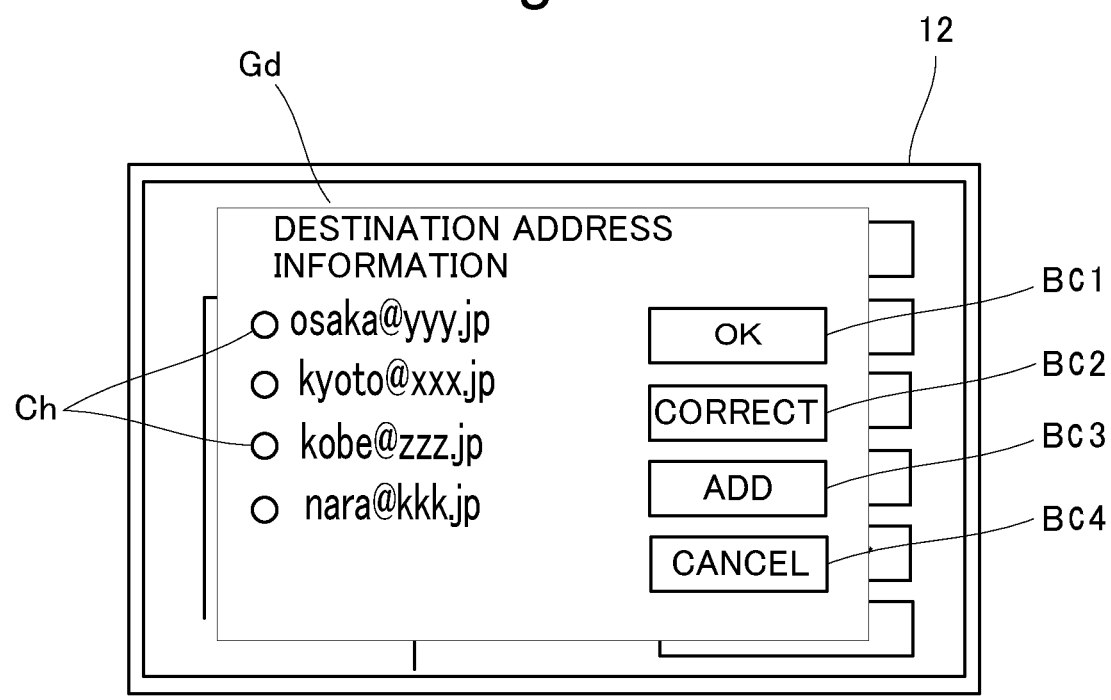
FIG. 10 is a diagram illustrating a screen of the first display section displaying a selection dialog for selecting a destination address.

Here, when the user has performed touch operation on, for example, the destination button Bb1 on the e-mail creation support screen Gb illustrated in FIG. 8 ("Bb1" in step S109), the first control section 11 receives the instruction for displaying the destination address list Title button Bd2, searches the mail information M stored in the first storage section 19, acquires, for example, a plurality of destination addresses E11 to E14 in the destination address list Title button Bd2 illustrated in FIG. 2, and displays a selection dialog Gd as illustrated in FIG. 10 at the first display section 12 (step S110).

Displayed on the selection dialog Gd illustrated in FIG. 10 are: for example, the plurality of destination addresses E11 to E14 and check boxes Ch corresponding thereto, an OK button Bc1, a correct button Bc2, an add button Bc3, and a cancel button Bc4. For example, when any of the check boxes Ch has been selected through touch operation and touch operation has been performed on the OK button Bc1, the first control section 11 receives selection of the destination address corresponding to the selected check box described above.

Figure 11:
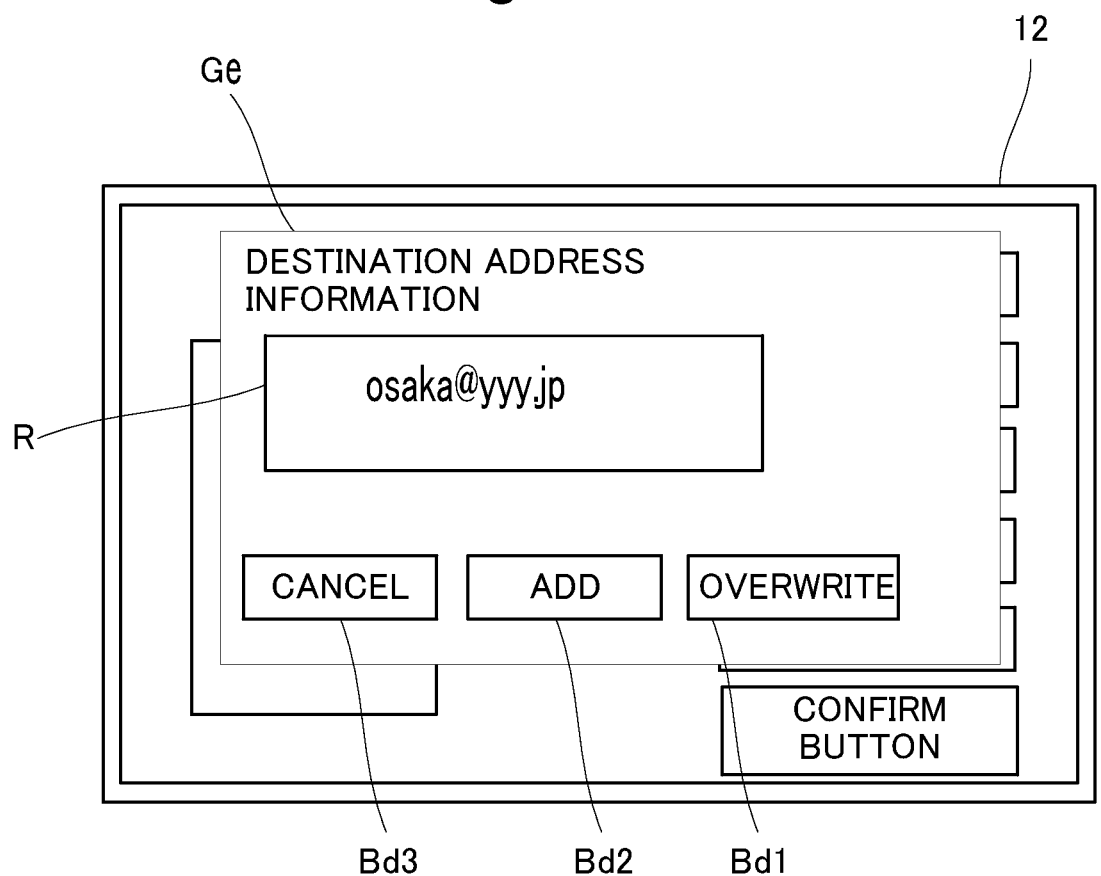
FIG. 11 is a diagram illustrating a screen of the first display section displaying an additional correction dialog for additionally correcting the destination address.

Moreover, when any of the check boxes Ch has been selected through touch operation and touch operation has been performed on the correct button Bc2 or the add button Bc3, the first control section 11 closes the selection dialog Gd and displays an addition and correction dialog Ge as illustrated in FIG. 11 at the first display section 12. Displayed on the addition and correction dialog Ge are: a display column R for the destination address E1 corresponding to the selected check box Ch; an overwrite button Bd1; an add button Title button Bd2; and a cancel button Bd3. For example, when the user has selected the display column R through touch operation, the first control section 11 causes the first display section 12 to display a soft keyboard. It is possible for the user to operate the soft key to input an instruction for correcting or rewriting the destination address corresponding to the display column R. After the inputting for the correction or the rewriting, the user performs touch operation on the overwrite button Bd1 or the add button Title button Bd2.

At this point, when touch operation has been performed on the overwrite button Bd1, the first control section 11 (one example of an update section in the scope of the claims) overwrites the corresponding destination address in the display column R to the original destination address in the mail information M stored in the first storage section 19 for update. Then the first control section 11 closes the addition and correction dialog Ge. The selection of the aforementioned destination address by the user after updating the destination address as described above results in selection of the corrected or rewritten destination address as transmission destination information of the e-mail by the first control section 11.

When touch operation has been performed on the add button Title button Bd2, the first control section 11 adds the destination address displayed on the display column R at this point to the mail information M in the first storage section 19. Then the first control section 11 closes the addition and correction dialog Ge. When the user has selected the updated destination address in this state, the selection of the destination address updated as the transmission destination information of the e-mail is received by the first control section 11.

When touch operation has been performed on the cancel button Bd3, the first control section 11 neither updates nor adds the destination address E1 and closes the addition and correction dialog Ge.

When the destination address on the selection dialog Gd as described above has been selected, the first control section 11 sets the selected destination address as an e-mail transmission partner (step S111).

Figure 12:
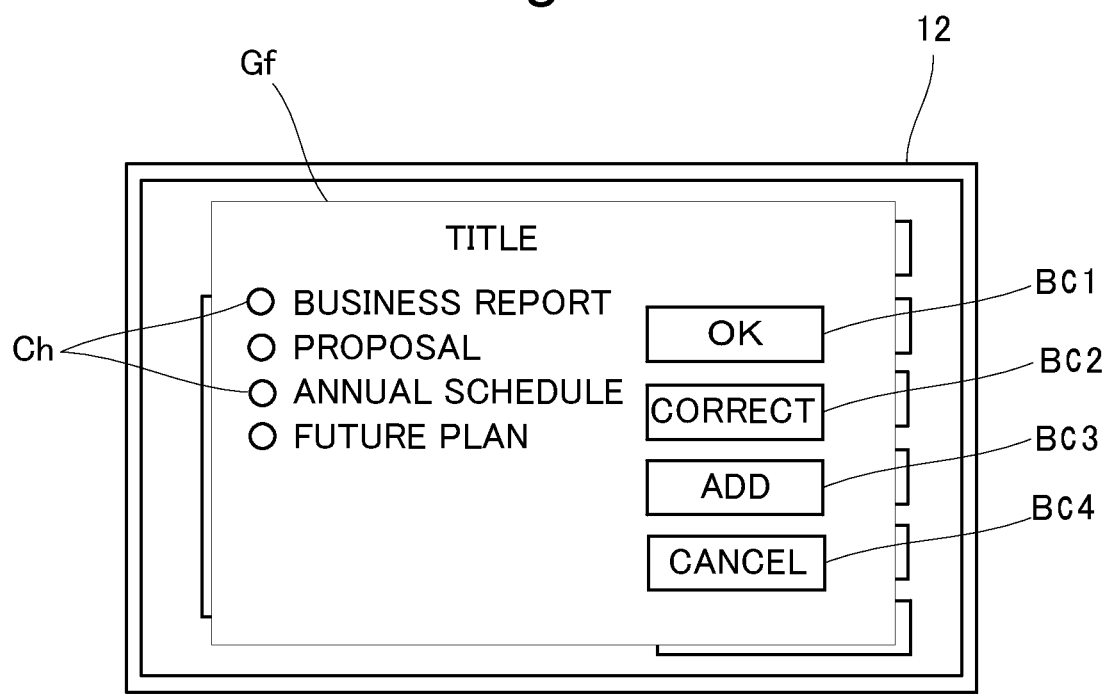
FIG. 12 is a diagram illustrating a screen of the first display section displaying a selection dialog for selecting a title.

Next, when touch operation has been performed on the title button Bb2 on the e-mail creation support screen Gb illustrated in FIG. 8 by the user ("Bb2" in step S109), the first control section 11 receives the instruction for displaying the title list L2, searches the mail information M stored in the first storage section 19, acquires, for example, a plurality of tiles E21 to E24 in the title list L2 illustrated in FIG. 2, and displays a selection dialog Gf as illustrated in FIG. 12 at the first display section 12 (step S112).

Displayed on the selection dialog Gf illustrated in FIG. 12 under control performed by the first control section 11 are: for example, the plurality of titles E21 to E24 (FIG. 2) and checkboxes Ch corresponding thereto, an OK button Bc1, a correct button Bc2, an add button Bc3, and a cancel button Bc4. For example, when any of the check boxes Ch has been selected through touch operation and touch operation has been performed on the OK button Bc1, the first control section 11 receives the selection of the title corresponding to the selected check box ch.

Figure 13:
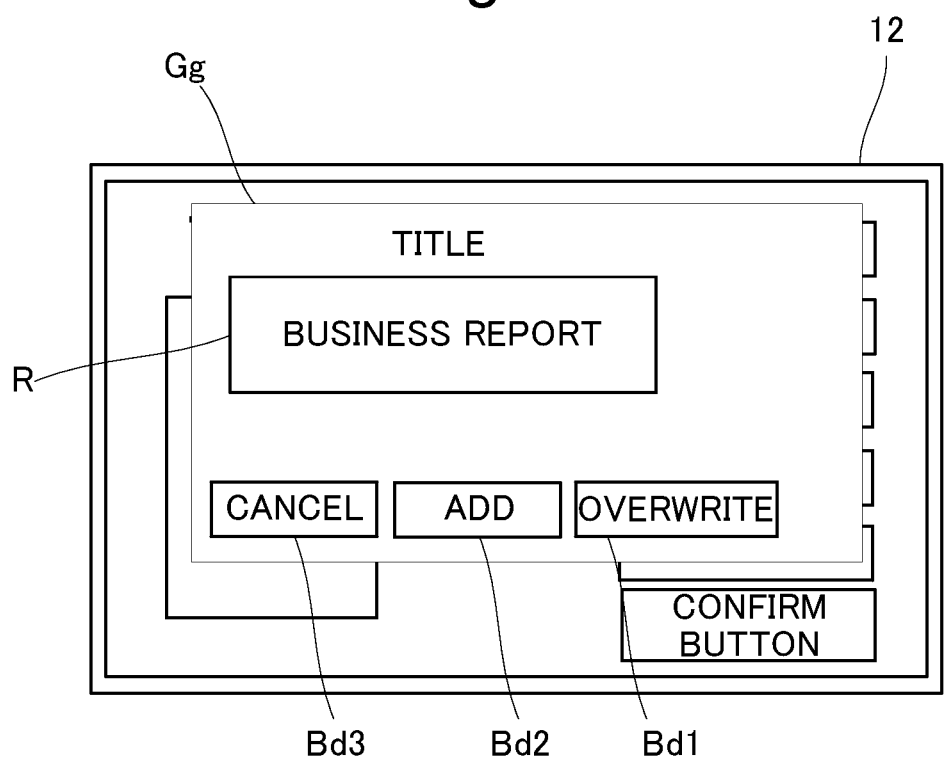
FIG. 13 is a diagram illustrating a screen of the first display section displaying an addition and correction dialog for adding and correcting the title.

When any of the check boxes Ch has been selected through touch operation and touch operation has been performed on the correct button Bc2 or the add button Bc3, the first control section 11 closes the selection dialog Gf and displays the addition and correction dialog Gg as illustrated in FIG. 13 at the first display section 12. Displayed on the addition and correction dialog Gg are: a display column R of the title E2 corresponding to the selected check box Ch, an overwrite button Bd1, an add button Title button Bd2, and a cancel button Bd3. For example, when the display column R has been selected by the user, the first control section 11 causes the first display section 12 to display a soft keyboard. It is possible for the user to operate the soft key to input an instruction for correcting or rewriting the title displayed on the display column R. After the inputting for the correction or the overwriting, the user performs touch operation on the overwrite button Bd1 or the add button Title button Bd2.

When touch operation has been performed on the overwrite button Bd1 at this point, the first control section 11 overwrites the title displayed on the display column R to the original title in the mail information M stored in the first storage section 19 to update this title. Then the first control section 11 closes the addition and correction dialog Gg. When the aforementioned title on the selection dialog Gf has been selected by the user after the updating the title as described above, the selection of the title corrected or rewritten as the title of the e-mail is received by the first control section 11.

When the title E2 has been selected on the selection dialog Gf or the addition and correction dialog Gg as described above, the first control section 11 sets the selected title E2 in the e-mail (step S113).

Figure 14:
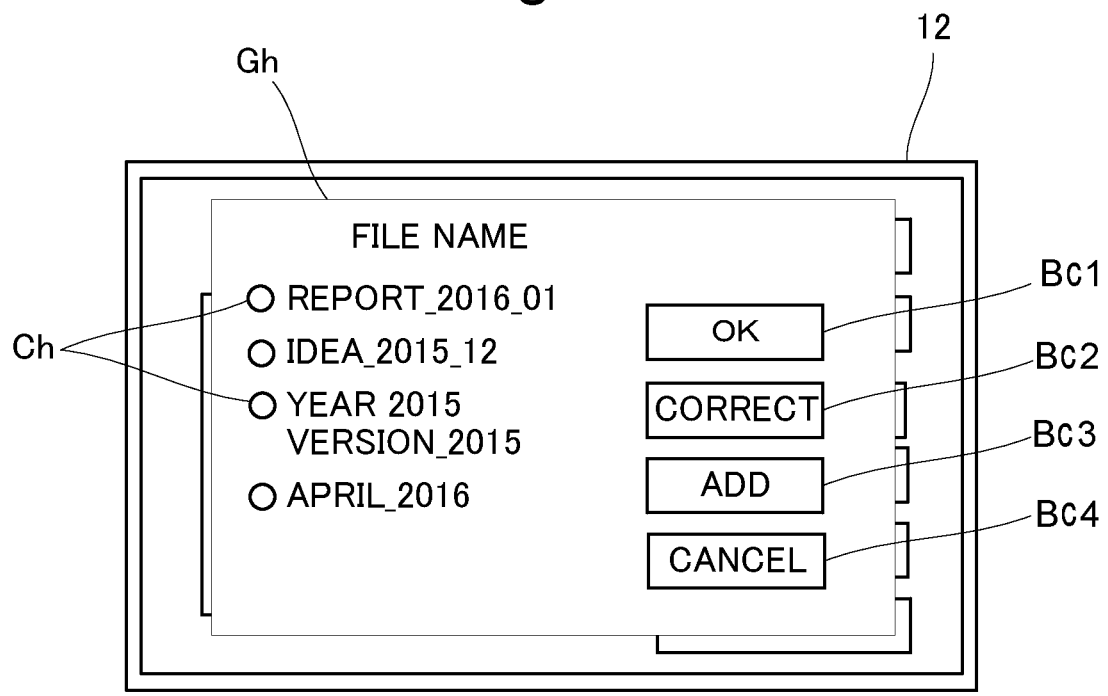
FIG. 14 is a diagram illustrating a screen of the first display section displaying a selection dialog for selecting a file name.

Next, when touch operation has been performed on the file name button Bb4 on the screen illustrated in FIG. 8 by the user ("Bb4" in step S108), the first control section 11 receives the instruction for displaying the file name list L4, searches the mail information M in the first storage section 19, acquires, for example, a plurality of file names E41 to E44 (FIG. 2) in the file name list L4 illustrated in FIG. 2, and displays a selection dialog Gh as illustrated in FIG. 14 at the first display section 12 to start processing of setting the file name E41 to E44 (step S114).

Displayed on the selection dialog Gh illustrated in FIG. 14 are: for example, the plurality of file names E41 to 44 and check boxes respectively corresponding thereto; an OK button Bc1, a correct button Bc2, an add button Bc3, and a cancel button Bc4. For example, when any of the check boxes has been selected through touch operation and touch operation has been performed on the OK button Bc1, the first control section 11 receives the selection of the file name corresponding to the selected check box Ch.

Figure 15:
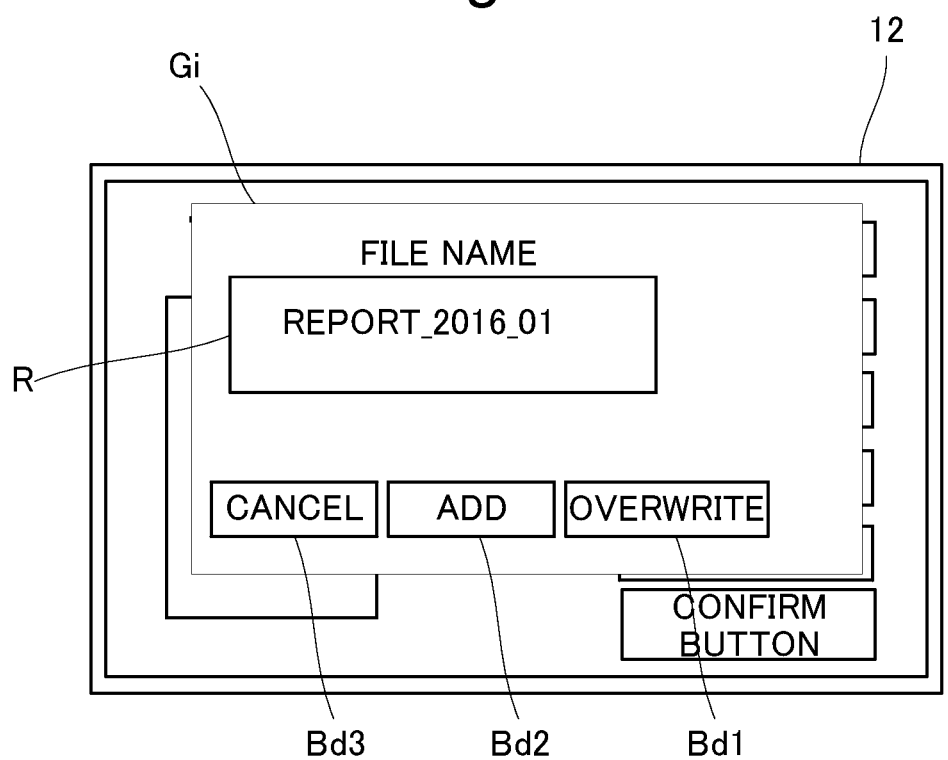
FIG. 15 is a diagram illustrating a screen of the first display section displaying an additional correction dialog for additionally correcting the file name.

When any of the check boxes Ch has been selected through touch operation and touch operation has been performed on the correct button Bc2 or the add button Bc3, the first control section 11 closes the selection dialog Gh and displays an addition and correction dialog Gi as illustrated in FIG. 15 at the first display section 12. Displayed on the addition and correction dialog Gi are: a display column R for the file name corresponding to the selected check box Ch, an overwrite button Bd1, an add button Bd2, and a cancel button Bd3. For example, when the display column R has been selected through touch operation by the user, the first control section 11 causes the first display section 12 to display a soft keyboard. It is possible for the user to operate the soft key to input an instruction for correcting or rewriting the file name displayed on the display column R. After the inputting for the aforementioned correction or overwriting, the user performs touch operation on the overwrite button Bd1 or the add button Title button Bd2. When touch operation has been performed on the overwrite button Bd1 at this point, the first control section 11 overwrites the file name displayed on the display column R to the original file in the mail information M stored in the first storage section 19 to update this file name. Then the first control section 11 closes the addition and correction dialog Gi. The selection of the file name on the selection dialog Gh after updating the aforementioned file name by the user as described above causes the first control section 11 to select the corrected or rewritten file name as the file name of the e-mail.

When touch operation has been performed on the title button Title button Bd2, the first control section 11 adds the file name displayed on the display column R to the mail information M stored in the first storage section 19 for storage to add this file name. Then the first control section 11 closes the addition and correction dialog Gi. The selection of the file name on the selection dialog Gh after adding the aforementioned file name by the user as described above causes the first control section 11 to receive the selection of the added file name as the file name of the e-mail.

When touch operation has been performed on the cancel button Bd3, the first control section 11 closes the addition and correction dialog Gi without updating the file name E4.

The selection of the file name on the selection dialog Gh as described above causes the first control section 11 to add, to the e-mail, a file indicated by the selected file name and included in the files stored in the first storage section 19 (step S115).

Figure 16:
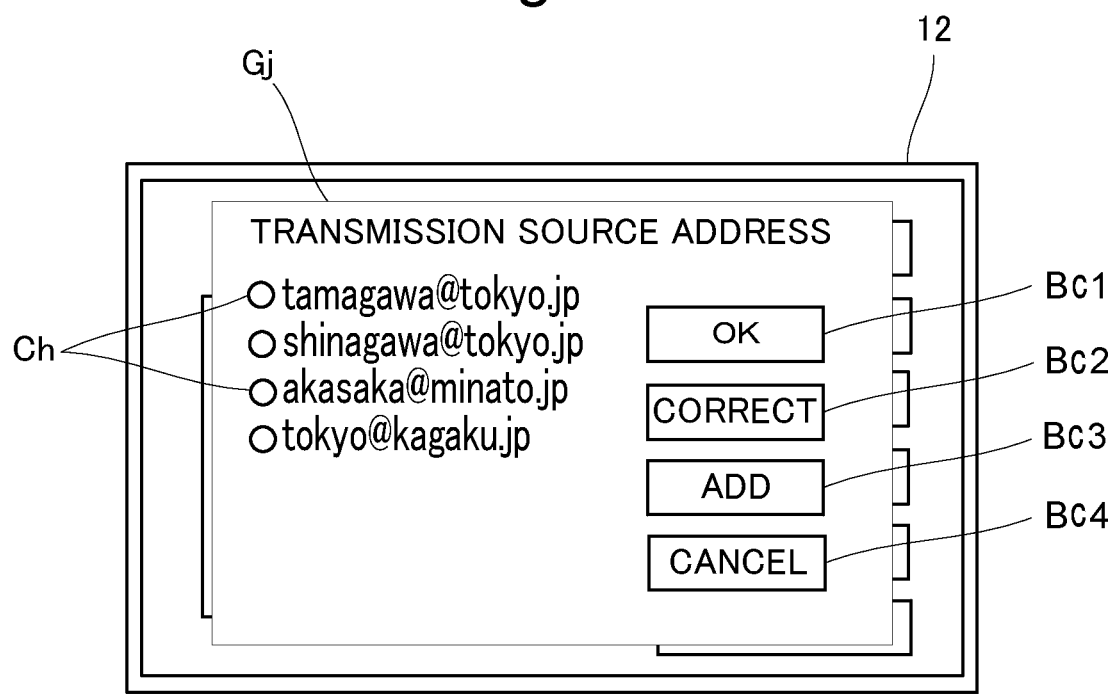
FIG. 16 is a diagram illustrating a screen of the first display section displaying a selection dialog for selecting a transmission source address.

Next, when touch operation has been performed on the transmission source button Bb5 on the e-mail creation support screen Gb illustrated in FIG. 8 by the user ("Bb5" in step S109), the first control section 11 receives the instruction for displaying the transmission source address list L5, searches the mail information M stored in the first storage section 19, acquires one or a plurality of transmission source addresses E51 to E54 in the transmission source address list L5 illustrated in FIG. 2, and displays a selection dialog Gj as illustrated in FIG. 16 at the first display section 12 (step S116).

Displayed on the selection dialog Gj illustrated in FIG. 16 are: for example, the plurality of transmission source addresses E51 to E54 and check boxes Ch respectively corresponding thereto, an OK button Bc1, a correct button Bc2, an add button Bc3, and a cancel button Bc4. For example, when any of the check boxes Ch has been selected through touch operation and touch operation has been performed on the OK button Bc1, the first control section 11 selects the transmission source address corresponding to the selected check box Ch.

Figure 17:
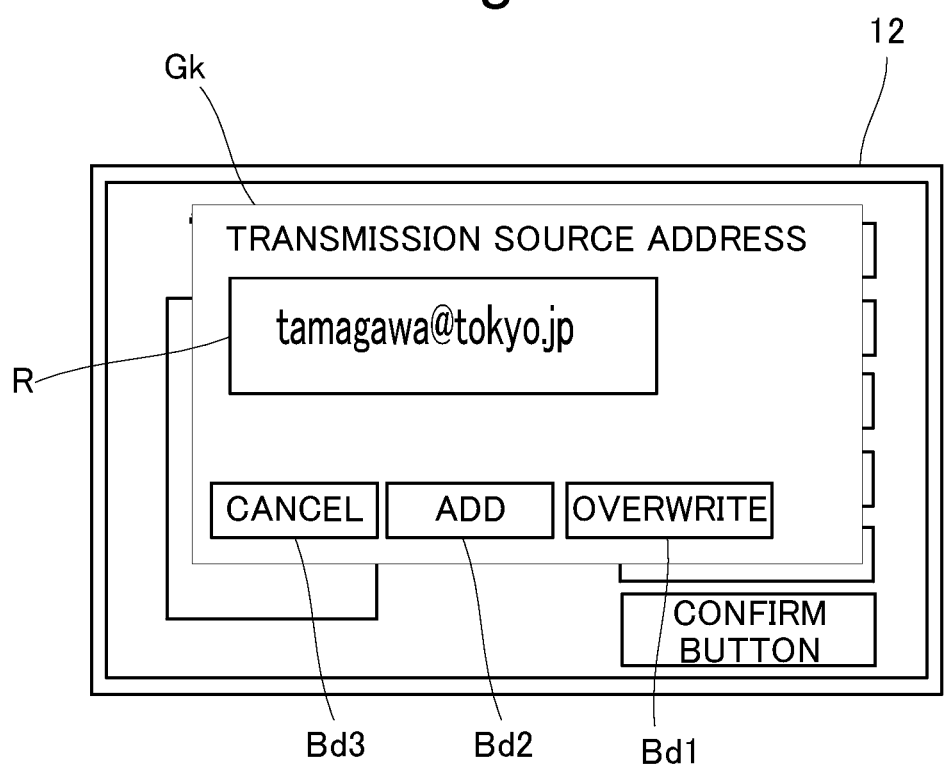
FIG. 17 is a diagram illustrating a screen of the first display section displaying an addition and correction dialog for adding and correcting the transmission source address.

When any of the check boxes Ch has been selected through touch operation and touch operation has been performed on the correct button Bc2 or the add button Bc3, the first control section 11 closes the selection dialog Gj and displays an addition and correction dialog Gk as illustrated in FIG. 17 at the first display section 12. Displayed on the addition and correction dialog Gk are: a display column R for the transmission source address corresponding to the selected check box Ch; an overwrite button Bd1, an add button Title button Bd2, and a cancel button Bd3. For example, when the display column R has been selected through touch operation by the user, the first control section 11 causes the first display section 12 to display a soft keyboard. It is possible for the user to operate the soft key to input an instruction for correcting or rewriting the transmission source address displayed on the display column R.

After the inputting for the correction or the rewriting, the user performs touch operation on the overwrite button Bd1 or the add button Title button Bd2. When touch operation has been performed on the overwrite button Bd1 at this point, the first control section 11 overwrites the transmission source address displayed on the display column R to the original transmission source address in the mail information M stored in the first storage section 19 to update this transmission source address. Then the first control section 11 closes the addition and correction dialog Gk. The selection of the transmission source address on the selection dialog Gj after updating this transmission source address as described above causes the first control section 11 to select the corrected or rewritten transmission source address as a transmission source address of the e-mail.

When touch operation has been performed on the cancel button Bd3, the first control section 11 closes the addition and correction dialog Gk without performing update or addition of the transmission source address E5.

The transmission source address is selected on the selection dialog Gj or the addition and correction dialog Gk as described above. Then the first control section 11 sets the selected transmission source address E5 in the e-mail (step S117).

Figure 18A:
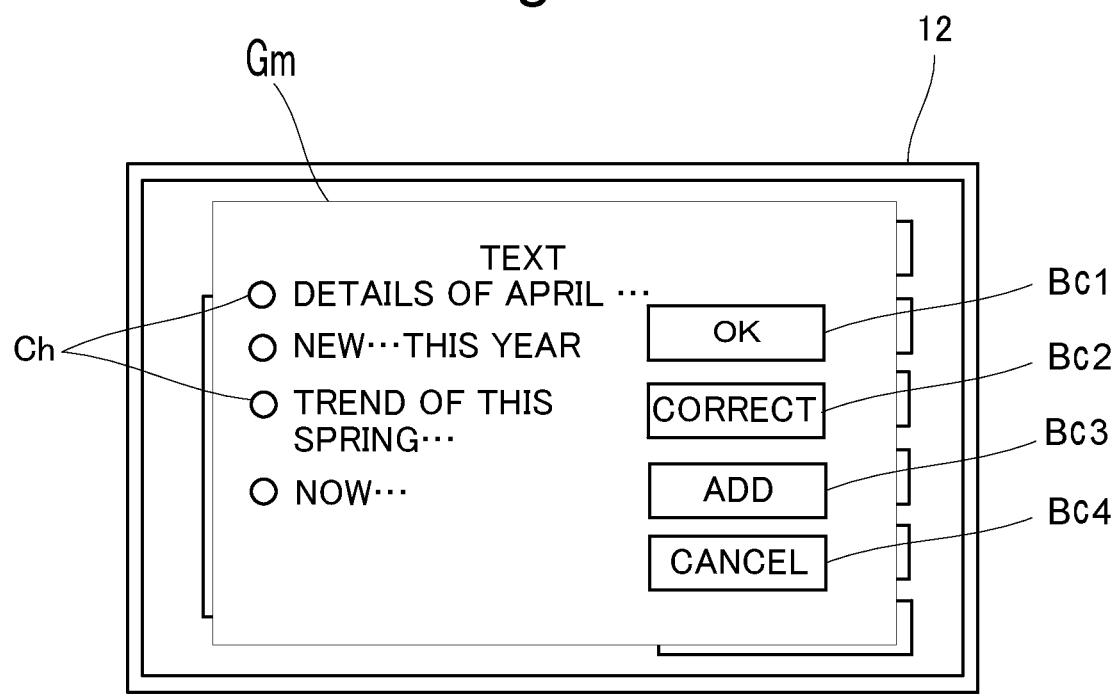
FIG. 18A is a diagram illustrating a screen of the first display section displaying a selection dialog for selecting a text.

Subsequently, when touch operation has been performed on the text button Bb3 by the user (step S118), the first control section 11 receives an instruction for displaying a list of texts which can be used as transmission sources in the e-mail, searches the mail information M stored in the first storage section 19, and, with reference to the transmission source address-text correspondence list L6, detects one or the plurality of texts corresponding to the transmission source address selected in step S115. The first control section 11 displays a selection dialog Gm as illustrated in FIG. 18A at the first display section 12 to thereby display the detected text (step S119). Displayed on the selection dialog Gm are: a plurality of texts E31 to 34 (FIG. 2) and check boxes Ch respectively corresponding thereto; an OK button Bc1, a correct button Bc2, an add button Bc3, and a cancel button Bc4. For example, when any of the check boxes Ch has been selected through touch operation and touch operation has been performed on the OK button Bc1, the first control section 11 selects the text corresponding to the selected check box Ch.

Figure 19:
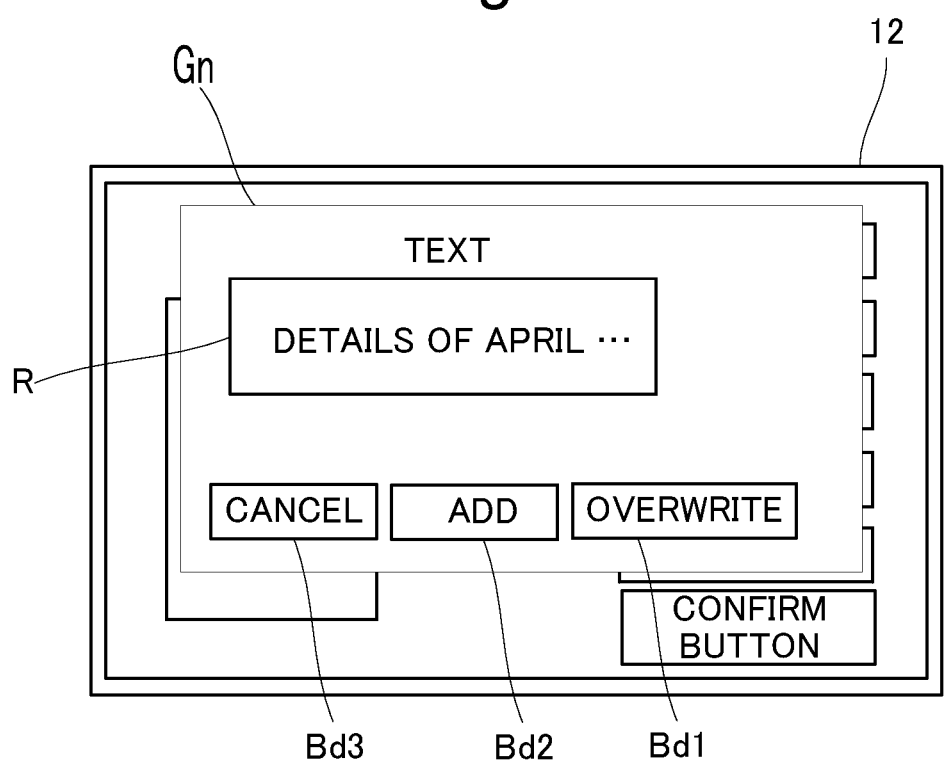
FIG. 19 is a diagram illustrating a screen of the first display section displaying a correction dialog for correcting the text.

When any of the check boxes Ch has been selected through touch operation and touch operation has been performed on the correct button Bc2, the first control section 11 closes the selection dialog Gm and displays a correction dialog Gn as illustrated in FIG. 19 at the first display section 12. Displayed on the correction dialog Gn are: a display column R for the text corresponding to the selected check box Ch; an overwrite button Bd1; an add button Title button Bd2; and a cancel button Bd3. For example, when the display column R has been selected through touch operation by the user, the first control section 11 causes display of the aforementioned soft key, and when the text displayed on the display column R has been corrected or rewritten through operation of the soft key by the user and touch operation has been performed on the overwrite button Bd1, the first control section 11 overwrites the text displayed on the display column R to the original text in the mail information M stored in the first storage section 19 to update this text.

When touch operation has been performed on the add button Title button Bd2, the first control section 11 adds the text displayed on the display column R (the text corrected or rewritten through the operation of the aforementioned soft key while being kept original) to the original text in the mail information M stored in the first storage section 19 for storage.

After processing performed based on the operation of the overwrite button Bd1 or the add button Title button Bd2, the first control section 11 closes the correction dialog Gn. The selection of the text on the selection dialog Gm by the user after updating or adding the text as described above causes the first control section 11 to select the corrected or rewritten text as the text of the e-mail or causes the first control section 11 to further add the added text as the text of the e-mail.

Figure 18B:
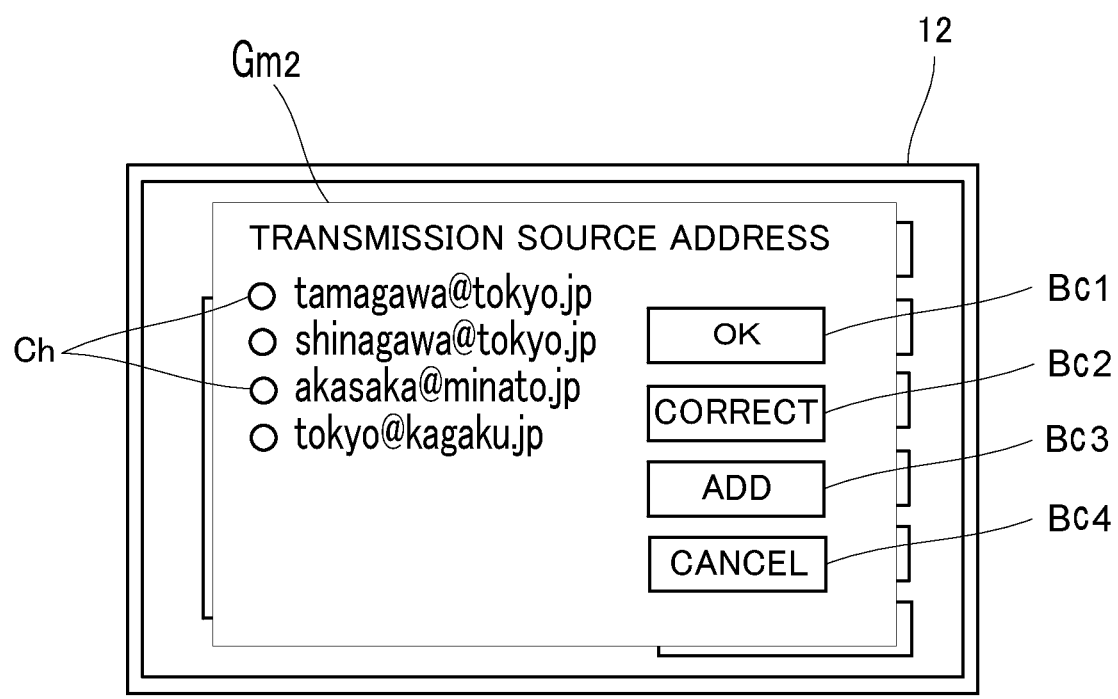
FIG. 18B is a diagram illustrating a screen of the first display section displaying a selection dialog for selecting the transmission source address.

Note that, in a case where any of the check boxes Ch has been selected through touch operation and touch operation has been performed on the add button Bc3 when the selection dialog Gm illustrated in FIG. 18A is displayed, upon judgement that the transmission source has not been set in the e-mail at this point, the first control section 11 displays, at the first display section 12, a selection dialog Gm2 for selecting the transmission source address as illustrated in FIG. 18B. When the selection dialog Gm2 is being displayed, the first control section 11 performs processing of receiving the transmission source address based on the same operation as that performed in case of the selection dialog Gj illustrated in FIG. 16. The first control section 11 displays the selection dialog Gm at the first display section 12 again after receiving the transmission source address.

In a case where any of the check boxes Ch has been selected through touch operation in FIG. 18A and touch operation has been further performed on the add button Bc3, upon judgment that the transmission source address has been already set in the e-mail at this point, the first control section 11 does not display the aforementioned selection dialog Gm2 and adds the text selected through the touch operation performed on the check box Ch to the original text in the mail information M stored in the first storage section 19 for storage.

The text is selected on the selection dialog Gm as described above. Then the first control section 11 sets the selected text in the e-mail (step S120).

Specifically, the selection of the transmission source address and the text is performed through procedures by which the transmission source address is first selected and then the text corresponding to the selected transmission source address is selected.

Therefore, selection of the different transmission source address results in selection of the different text. Consequently, for example, it is possible to properly use the plurality of mutually different texts between a case where the transmission source address corresponding to an individual is used and a case where the transmission source address corresponding to an organization to which the individual belongs is used.

Note that although not illustrated in the flowcharts of FIGS. 3A and 3B, when touch operation has been performed on the text button Bb3 before touch operation performed on the transmission source button Bb5, all the texts in the text list L3 are displayed on the selection dialog Gm by the first control section 11 and selection of all the texts displayed on the selection dialog Gm is received in accordance with operation performed on the OK button Bc1.

Through the aforementioned touch operation performed on the destination button Bb1, the title button Bb2, the text button Bb3, the file name button Bb4, and the transmission source button Bb5 and processing performed following the aforementioned touch operation, the destination address, the title, the transmission source address, and the text are set in the e-mail and image data of the file name is also added to the e-mail, thereby creating the e-mail.

Figure 20:
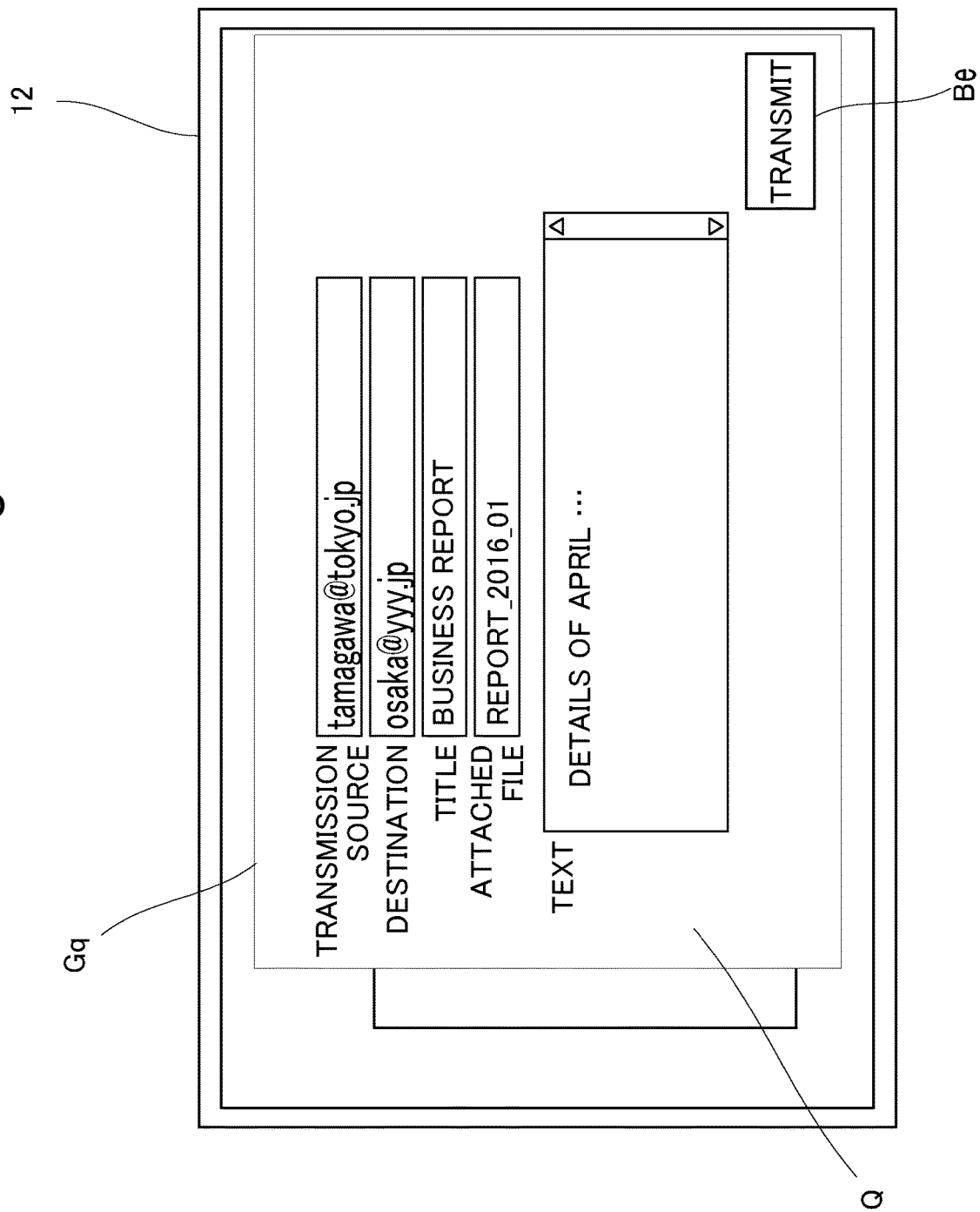
FIG. 20 is a diagram illustrating a screen of the first display section displaying an e-mail.

Next, when touch operation has been performed on the confirm button Bb6 on the screen Gb illustrated in FIG. 8 by the user ("Yes" in step S121), the first control section 11 receives an instruction for displaying information indicating contents of the e-mail and, as illustrated in FIG. 20, displays, on a dialog Gq of the first display section 12, an image including the information indicating the contents of the e-mail Q created as described above (step S122).

Then when touch operation has been performed on a transmit button Be after confirmation of the contents of the e-mail Q on the dialog Gq illustrated in FIG. 20 by the user, an instruction for transmitting the e-mail is inputted to the first operation section 14 and the first control section 11 causes the first network communication section 15 to transmit the e-mail Q to the network N in accordance with the instruction for the transmission (step S123). The e-mail Q is received by the server on the network N and is transmitted from the server to a terminal, such as PC, which is indicated by the destination address set in the e-mail Q.

Figure 21:
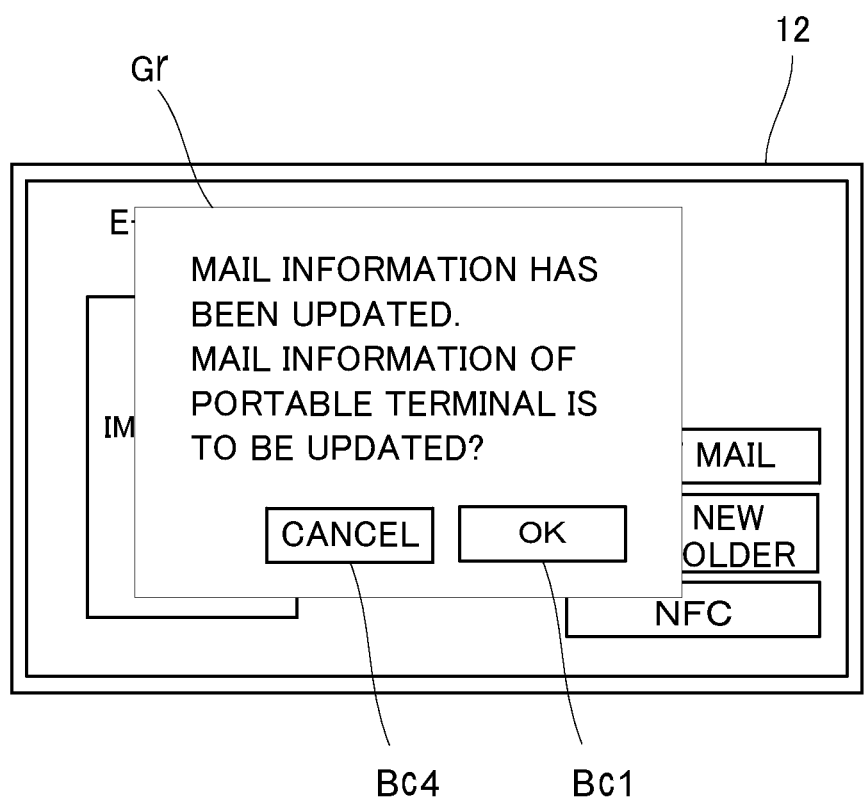
FIG. 21 is a diagram illustrating a screen of the first display section displaying a message which prompts update of the mail information.

When the transmission of the e-mail Q had ended as described above, the first control section 11 displays, on the dialog Gr of the first display section 12, a message prompting update of the mail information M stored in the portable terminal as illustrated in FIG. 21 (step S124). The user reads the message and performs touch operation on the OK button Bc1 or the cancel button Bc4 of the dialog Gr of the first display section 12. When touch operation has been performed on the add button Bc3 at this point ("Bc4" in step S125), the first control section 11 erases the mail information M stored in the first storage section 19 without transmitting the mail information M stored in the first storage section 19 (step S127), ending the processing of FIGS. 3A and 3B.

Moreover, when touch operation has been performed on the OK button Bc1 ("Bc1" in step S125), the first control section 11 transmits a request for updating the mail information M together with the mail information M stored in the first storage section 19 from the first near field radio communication section 16 to the portable terminal device 20 (step S126) and then erases the mail information M stored in the first storage section 19 (step S127), ending the processing of FIGS. 3A and 3B.

When the request for updating the mail information M together with the mail information M stored in the first storage section 19 has been received by the second near field radio communication section 26 in the portable terminal device 20, the second control section 21 rewrites, for update, the mail information M stored in the second storage section 29 to the received mail information M in accordance with the request for updating the mail information M.

Note that instead of transmitting the request for updating the mail information M together with the mail information M stored in the first storage section 19 to the portable terminal device 20, the mail information M stored in the first storage section 19 may be transmitted to a user having the transmission source address set in the e-mail Q. The aforementioned mail information M will not be transmitted. In this case, the first control section 11 of the image forming apparatus 10 creates an e-mail with the transmission source address set as the destination address, adds the request for updating the mail information M together with the mail information M stored in the first storage section 19 to the aforementioned e-mail, and transmits this e-mail from the first network communication section 15 to the network N. Then the first control section 11 erases the mail information M stored in the first storage section 19. This e-mail is received by the server on the network N and is transmitted from the server to the terminal device 40 held by the user holding the destination address (transmission source address). The user of the terminal device 40 operates the fourth operation section 44, causing the fourth storage section 49 to store the request for updating the mail information M added to the e-mail together with the mail information.

Then when the portable terminal device 20 (or the IC card 30) has been arranged near the antenna of the fourth near field radio communication section 46 of the terminal device 40 and the instruction for updating the mail information M has been provided through operation of the fourth operation section 44 by the user, the fourth control section 41 transmits the request for updating the mail information M stored in the fourth storage section 49 together with the mail information M from the fourth near field radio communication section 46 to the portable terminal device 20 (or the IC card 30). When the request for updating the mail information M together with the mail information M has been received by the second near field radio communication section 26 (or the third near field radio communication section 36) in the portable terminal device 20 (or the IC card 30), the mail information M stored in the second storage section 29 (or the third storage section 39) is rewritten to the received mail information M for update.

Note that the e-mail creation support processing (e-mail information setting processing) is started after the image forming apparatus 10 previously acquires and stores an image to be transmitted upon the e-mail creation in this embodiment but the invention is not limited thereto and the image to be transmitted may be acquired after the e-mail creation support processing is first performed. In this case, the first control section 11 does not display, on the e-mail creation support screen Gb illustrated in FIG. 8 beyond, an image P indicating contents of data of the e-mail to be transmitted, and displays the image P at a time point at which the image to be transmitted has been acquired.

In this embodiment as described above, the mail information M including the destination address, the title, the text, the file name, and the transmission source address required for the e-mail creation is previously stored into the second storage section 29 of the portable terminal device 20 or the third storage section 39 of the IC card 30 of the portable terminal device 20, and the mail information M is transmitted from the portable terminal device 20 or the IC card 30 to the image forming apparatus 10 through near field radio communication upon the e-mail creation. Thus, in the image forming apparatus 10, the destination address, the title, the text, the file name, and the transmission source address can simply be set in the e-mail based on the mail information M, making it easy to create the e-mail.

The mail information M stored in the first storage section 19 of the image forming apparatus 10 is erased after the e-mail transmission, permitting prevention of leak of the mail information M.

Note that the aforementioned embodiment has been described, referring to a multifunction peripheral as one embodiment of the image forming apparatus according to the present invention, but is only one example, and any other image forming apparatus such as a copier, a printer, or a facsimile device may be used.

The configuration and the processing of the embodiment described above with reference to FIGS. 1 to 21 form just one embodiment of the present invention but the present invention is not limited to these configuration and processing.

Various modified embodiments and altered embodiments of the invention will be obvious to those skilled in the art without departing from the scope and the spirits of the invention. Moreover, it is to be understood that the invention is not limited to the illustrative embodiment described in the specification.

What is claimed is:

1. A communication system comprising:
an electronic device transmitting electronic data through a network; and
a portable terminal performing wireless short distance communication with the electronic device,
wherein
the portable terminal includes:
a second storage section storing transmission information of the electronic data, the transmission information including at least transmission partner information; and
a second near field radio communication section transmitting the transmission information to the electronic device, and
the electronic device includes:
a display section;
a first operation section to which an instruction from a user is inputted;
a first near field radio communication section receiving the transmission information from the portable terminal;
a first network communication section transmitting the electronic data; and
a first control section displaying, on a screen of the display section, a list including the transmission partner information indicated by the transmission information received at the first near field radio communication section, creating electronic data as a transmission target by use of the transmission partner information selected from the list through operation of the first operation section and transmission target data, causing the first network communication section to transmit the created electronic data, and erasing, from the electronic device, the transmission information received from the portable terminal after the transmission,
wherein the electronic data is an e-mail, and
the transmission information is mail information including a title and a text of the e-mail, in addition to a destination address as the transmission partner information,
wherein the mail information includes a plurality of transmission source addresses and texts respectively corresponding to the transmission source addresses, and
the first control section of the electronic device displays, on the screen of the display section, a list of destination addresses, titles, transmission source addresses and texts based on the mail information received at the first short distance communication section, and when one of the texts has been selected from the list through operation of the operation section and an operation is performed to add the selected text to the email, the first control section adds the selected text to an original text in the mail information stored in the second storage section,
and when the first control section determines that the transmission source address is not set in the e-mail, the first control unit displays a selection dialog to select the transmission source address on the screen of the display section,
and when the first control section determines that the transmission source address has already been set in the e-mail, the first control section does not display the selection dialog.

2. The communication system according to claim 1, wherein
the wireless short distance communication is NFC communication.

3. The communication system according to claim 1, wherein
the control section of the electronic device rewrites the mail information based on operation of the operation section and transmits the rewritten mail information from the first short distance communication section to the portable terminal, and
the portable terminal further includes an updating section, upon receiving the rewritten mail information at the second short distance communication section, updating the mail information in the storage section to the rewritten mail information.

4. The communication system according to claim 1, wherein
the mail information is created in the portable terminal and used for communication at the portable terminal.

5. The communication system according to claim 1, further comprising
a terminal device, wherein
the control section of the electronic device rewrites the mail information based on operation of the operation section and transmits the rewritten mail information from the network communication section to the terminal device, in the terminal device, the rewritten mail information is received and the rewritten mail information is transmitted to the portable terminal through short distance communication, and in the portable terminal, the rewritten mail information is received at the first short distance communication section and the mail information in the storage section is updated to the rewritten mail information.

6. The communication system according to claim 1, wherein the mail information includes a transmission source address, and the control section of the electronic device rewrites the mail information based on operation of the operation section, creates an e-mail with the transmission source address as a destination address by using the rewritten mail information, and transmits, from the network communication section, the e-mail to the terminal device indicated by the destination address.

7. An electronic device transmitting electronic data through a network and performing wireless short distance communication with a portable terminal, the electronic device comprising:

a display section;

a first operation section to which an instruction from a user is inputted;

a first near field radio communication section receiving the transmission information from the portable terminal;

a first network communication section transmitting the electronic data; and a first control section displaying, on a screen of the display section, a list including the transmission partner information indicated by the transmission information received at the first near field radio communication section, creating electronic data as a transmission target by use of the transmission partner information selected from the list through operation of the first operation section and transmission target data, causing the first network communication section to transmit the created electronic data, and erasing, from the electronic device, the transmission information received from the portable terminal after the transmission, wherein the electronic data is an e-mail, and the transmission information is mail information including a title and a text of the e-mail, in addition to a destination address as the transmission partner information, wherein the mail information includes a plurality of transmission source addresses and texts respectively corresponding to the transmission source addresses, and the first control section of the electronic device displays, on the screen of the display section, a list of destination addresses, titles, transmission source addresses and texts based on the mail information received at the first short distance communication section, and when one of the texts has been selected from the list through operation of the operation section and an operation is performed to add the selected text to the email, the first control section adds the selected text to an original text in the mail information stored in the second storage section, and when the first control section determines that the transmission source address is not set in the e-mail, the first control unit displays a selection dialog to select the transmission source address on the screen of the display section, and when the first control section determines that the transmission source address has already been set in the e-mail, the first control section does not display the selection dialog.

* * * * *